(12) United States Patent
Kawamoto et al.

(10) Patent No.: US 10,029,538 B2
(45) Date of Patent: Jul. 24, 2018

(54) REFRIGERATION CYCLE

(71) Applicant: DENSO CORPORATION, Kariya, Aichi-pref. (JP)

(72) Inventors: Yoichiro Kawamoto, Kariya (JP); Etsuhisa Yamada, Kariya (JP); Haruyuki Nishijima, Kariya (JP); Yoshiaki Takano, Kariya (JP); Yoshiyuki Yokoyama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 47 days.

(21) Appl. No.: 15/023,570

(22) PCT Filed: Sep. 15, 2014

(86) PCT No.: PCT/JP2014/004742
§ 371 (c)(1),
(2) Date: Mar. 21, 2016

(87) PCT Pub. No.: WO2015/040850
PCT Pub. Date: Mar. 26, 2015

(65) Prior Publication Data
US 2016/0200170 A1 Jul. 14, 2016

(30) Foreign Application Priority Data

Sep. 23, 2013 (JP) .................................. 2013-196310

(51) Int. Cl.
*B60H 1/00* (2006.01)
*F25B 49/02* (2006.01)
(Continued)

(52) U.S. Cl.
CPC ......... *B60H 1/00885* (2013.01); *F25B 40/02* (2013.01); *F25B 41/00* (2013.01);
(Continued)

(58) Field of Classification Search
CPC .... B60H 1/00885; F25B 43/006; F25B 41/00; F25B 41/067; F25B 41/043;
(Continued)

(56) References Cited

U.S. PATENT DOCUMENTS

2004/0003608 A1   1/2004   Takeuchi et al.
2004/0011065 A1*  1/2004   Takeuchi ................ F25B 9/008
                                                      62/170
(Continued)

FOREIGN PATENT DOCUMENTS

JP   S61076800 A   4/1986
JP   H05149652 A   6/1993
(Continued)

OTHER PUBLICATIONS

International Search Report and Written Opinion (in Japanese with English Translation) for PCT/JP2014/004742, dated Dec. 9, 2014; ISA/JP.

*Primary Examiner* — Mohammad M Ali
(74) *Attorney, Agent, or Firm* — Harness, Dickey & Pierce, P.L.C.

(57) ABSTRACT

An ejector-type refrigeration cycle includes a radiator radiating heat of refrigerant discharged from a compressor, an ejector depressurizing the refrigerant cooled in the radiator, a gas-liquid separator separating gas and liquid of the refrigerant flowing out of a diffuser portion of the ejector, an evaporator disposed in a refrigerant passage connecting the gas-liquid separator and a refrigerant suction port of the ejector, and an opening-closing valve switching between a first refrigerant flow path, in which an ejection refrigerant ejected from a nozzle portion of the ejector flows out of the diffuser portion, and a second refrigerant flow path, in which the ejection refrigerant flows out of the refrigerant suction port. When a rotation rate of the compressor is lower than or (Continued)

equal to a standard rotation rate, the first refrigerant flow path is switched to the second refrigerant flow path.

10 Claims, 7 Drawing Sheets

(51) Int. Cl.
  *F02B 41/06*  (2006.01)
  *F25B 43/00*  (2006.01)
  *F25B 41/00*  (2006.01)
  *F25B 41/04*  (2006.01)
  *F25B 41/06*  (2006.01)
  *F25B 40/02*  (2006.01)
  *B60H 1/32*  (2006.01)

(52) U.S. Cl.
  CPC .......... *F25B 41/043* (2013.01); *F25B 41/062* (2013.01); *F25B 41/067* (2013.01); *F25B 43/006* (2013.01); *F25B 49/022* (2013.01); *B60H 2001/3298* (2013.01); *F25B 2341/0012* (2013.01); *F25B 2341/0013* (2013.01); *F25B 2400/23* (2013.01); *F25B 2500/18* (2013.01); *F25B 2700/195* (2013.01); *F25B 2700/2104* (2013.01); *F25B 2700/2106* (2013.01); *F25B 2700/21173* (2013.01)

(58) Field of Classification Search
  CPC ............ F25B 49/022; F25B 2700/2104; F25B 2700/2106; F25B 2700/21173; F25B 2700/195; F25B 40/02; F25B 41/04; F25B 1/00; F25B 2341/0012; F25B 2341/0013
  USPC .................................................. 62/157, 500
  See application file for complete search history.

(56) References Cited

U.S. PATENT DOCUMENTS

| | | |
|---|---|---|
| 2004/0052656 A1 | 3/2004 | Saito et al. |
| 2004/0103685 A1* | 6/2004 | Yamaguchi ........ B60H 1/00899 62/500 |
| 2011/0005268 A1 | 1/2011 | Oshitani et al. |
| 2013/0000348 A1* | 1/2013 | Higashiiue ............. C09K 5/041 62/500 |
| 2015/0033790 A1 | 2/2015 | Yamada et al. |

FOREIGN PATENT DOCUMENTS

| | | |
|---|---|---|
| JP | 2002-022295 A | 1/2002 |
| JP | 2004-044849 A | 2/2004 |
| JP | 2004101141 A | 4/2004 |
| JP | 2009276051 A | 11/2009 |
| JP | 2013177879 A | 9/2013 |

* cited by examiner

NORMAL OPERATION MODE

LOW-LOAD OPERATION MODE

NORMAL OPERATION MODE

LOW-LOAD OPERATION MODE

REFRIGERATION CYCLE

CROSS REFERENCE TO RELATED APPLICATIONS

This application is a U.S. National Phase Application under 35 U.S.C. 371 of International Application No. PCT/JP2014/004742 filed on Sep. 15, 2014 and published in Japanese as WO 2015/040850 A1 on Mar. 26, 2015. This application is based on and claims the benefit of priority from Japanese Patent Application No. 2013-196310 filed on Sep. 23, 2013. The entire disclosures of all of the above applications are incorporated herein by reference.

TECHNICAL FIELD

The present disclosure relates to an ejector-type refrigeration cycle including an ejector as a refrigerant depressurizing device.

BACKGROUND ART

Conventionally, an ejector-type refrigeration cycle that is a vapor compression-type refrigeration cycle including an ejector as a refrigerant depressurizing device is known. For example, in Patent Document 1, an ejector-type refrigeration cycle is disclosed, which includes a gas-liquid separator that separates gas and liquid of refrigerant flowing out of an ejector. The liquid-phase refrigerant separated by the gas-liquid separator flows into an evaporator while the gas-phase refrigerant separated by the gas-liquid separator is drawn into a compressor.

More specifically, in the ejector-type refrigeration cycle of Patent Document 1, refrigerant flowing downstream of the evaporator is drawn through a refrigerant suction port of the ejector by a suction action (pump action) of high-speed ejection refrigerant ejected from a nozzle portion of the ejector. Mixture refrigerant of the ejection refrigerant and the suction refrigerant is pressurized in a diffuser portion (pressurizing portion) and flows into the gas-liquid separator.

Accordingly, in the ejector-type refrigeration cycle of Patent Document 1, a refrigerant pressure in the gas-liquid separator that corresponds to a pressure of refrigerant drawn into the compressor can be increased to be higher than an evaporation pressure of refrigerant in the evaporator. Hence, power consumption can be reduced and coefficient of performance (COP) can be improved, as compared to a normal refrigeration cycle device in which a pressure of refrigerant drawn into a compressor is approximately equal to an evaporation pressure of refrigerant in an evaporator.

In a configuration like the ejector-type refrigeration cycle of Patent Document 1, the refrigerant on a downstream side of the evaporator is drawn by the suction action of the ejection refrigerant ejected from the nozzle portion of the ejector. Thus, when a flow rate of the ejection refrigerant is reduced, a degree of reduction in suction capacity to draw the refrigerant on the downstream side of the evaporator through the refrigerant suction port is likely to be larger than a degree of reduction in flow rate of the ejection refrigerant.

Hence, when the flow rate of the ejection refrigerant in, for example, a low-load operation in which a thermal load on the cycle is reduced, the suction capacity of the ejector may decrease largely, and the refrigerant may not flow into the evaporator accordingly. Therefore, in the low-load operation, a cooling target fluid may not be cooled sufficiently in the evaporator.

PRIOR ART DOCUMENT

Patent Document

Patent Document 1: JP H5-149652

SUMMARY OF THE INVENTION

In consideration of the above-described points, it is an objective of the present disclosure to provide an ejector-type refrigeration cycle capable of sufficiently cooling a cooling target fluid regardless of load variation.

According to an aspect of the present disclosure, an ejector-type refrigeration cycle includes a compressor compressing and discharging a refrigerant, a radiator radiating heat of the refrigerant discharged from the compressor, and an ejector. The ejector includes a nozzle portion depressurizing the refrigerant flowing out of the radiator, a refrigerant suction port drawing a refrigerant by a suction action of an ejection refrigerant ejected at high speed from the nozzle portion, and a pressurizing portion pressurizing a mixture refrigerant of the ejection refrigerant and a suction refrigerant drawn from the refrigerant suction port. The ejector-type refrigeration cycle further includes a gas-liquid separation device separating the refrigerant flowing out of the pressurizing portion into a gas-phase refrigerant and a liquid-phase refrigerant, and causing the gas-phase refrigerant to flow out toward a suction port of the compressor, an evaporator disposed in a refrigerant passage connecting a liquid-phase refrigerant outflow port of the gas-liquid separation device and the refrigerant suction port, the evaporator evaporating the refrigerant passing therethrough, and a refrigerant flow-path switching device switching a path of the refrigerant circulating in a cycle. The refrigerant flow-path switching device is capable of switching between a first refrigerant flow path, in which the ejection refrigerant flows out of the pressurizing portion, and a second refrigerant flow path, in which the ejection refrigerant flows out of the refrigerant suction port.

Accordingly, when the refrigerant flow-path switching device selects the first refrigerant flow path, an ejector-type refrigeration cycle can be obtained, in which the refrigerant circulates in an order: the compressor→the radiator→the nozzle portion of the ejector→the pressurizing portion of the ejector→the gas-liquid separation device→the compressor while the refrigerant circulates in an order: the gas-liquid separation device→the evaporator→the refrigerant suction port of the ejector.

When the refrigerant flow-path switching device selects the second refrigerant flow path, a refrigeration cycle can be obtained, in which the refrigerant circulates in an order: the compressor→the radiator→the nozzle portion of the ejector→the evaporator→the compressor.

Therefore, even in a low-load operation where a suction performance of the ejector may reduce largely, the switching from the first refrigerant flow path to the second refrigerant flow path allows a refrigerant discharge performance of the compressor to surely supply the refrigerant depressurized in the nozzle portion of the ejector to the evaporator.

In other words, it can be prevented that the refrigerant cannot be supplied to the evaporator during the low-load operation, and a cooling target fluid can be cooled sufficiently regardless of load variation.

According to another aspect of the present disclosure, an ejector-type refrigeration cycle includes a compressor compressing and discharging a refrigerant, a radiator radiating heat of the refrigerant discharged from the compressor, and an ejector. The ejector includes a nozzle portion depressurizing the refrigerant flowing out of the radiator, a refrigerant suction port drawing a refrigerant by a suction action of an ejection refrigerant ejected at high speed from the nozzle portion, and a pressurizing portion pressurizing a mixture refrigerant of the ejection refrigerant and a suction refrigerant drawn from the refrigerant suction port. The ejector-type refrigeration cycle further includes a gas-liquid separation device separating the refrigerant flowing out of the pressurizing portion into a gas-phase refrigerant and a liquid-phase refrigerant, and causing the gas-phase refrigerant to flow out toward a suction port of the compressor, an evaporator disposed in a refrigerant passage connecting a liquid-phase refrigerant outflow port of the gas-liquid separation device and the refrigerant suction port, the evaporator evaporating the refrigerant passing therethrough, a bypass passage connecting a refrigerant outlet side of the evaporator and a suction port side of the compressor, and a refrigerant flow-path switching device switching a path of the refrigerant circulating in a cycle. The refrigerant flow-path switching device is capable of switching between a first refrigerant flow path, in which the refrigerant flowing out of the evaporator flows toward the refrigerant suction port, and a second refrigerant flow path, in which the refrigerant flowing out of the evaporator flows toward the suction port side of the compressor through the bypass passage.

Accordingly, when the refrigerant flow-path switching device selects the first refrigerant flow path, an ejector-type refrigeration cycle can be obtained, in which the refrigerant circulates in an order: the compressor→the radiator→the nozzle portion of the ejector→the pressurizing portion of the ejector→the gas-liquid separation device→the compressor while the refrigerant circulates in an order: the gas-liquid separation device→the evaporator→the refrigerant suction port of the ejector.

When the refrigerant flow-path switching device selects the second refrigerant flow path, a refrigeration cycle can be obtained, in which the refrigerant circulates in an order: the compressor→the radiator→the nozzle portion of the ejector→the pressurizing portion of the ejector→the gas-liquid separation device→the evaporator→the bypass passage→the compressor.

Therefore, it can be prevented that the refrigerant cannot be supplied to the evaporator during a low-load operation, and a cooling target fluid can be cooled sufficiently regardless of load variation.

EMBODIMENTS FOR EXPLOITATION OF THE INVENTION

Figure 1:
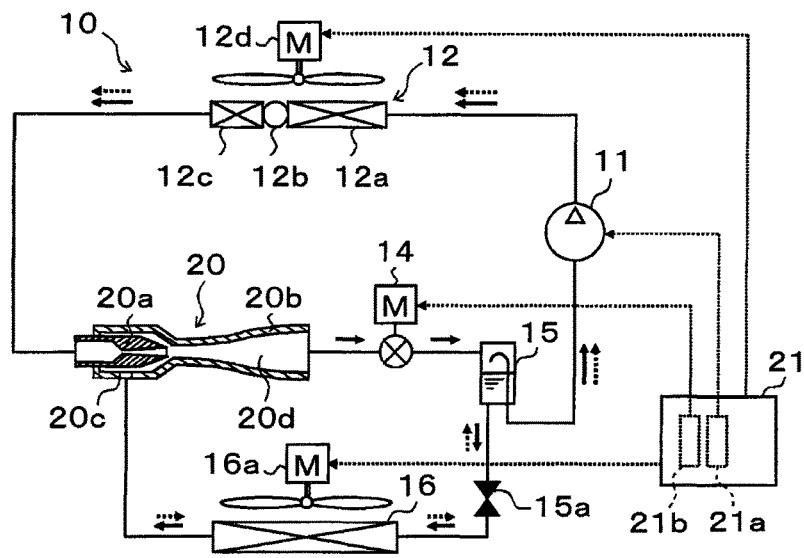
FIG. 1 is a schematic diagram showing an ejector-type refrigeration cycle according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described below with reference to the drawings. An ejector-type refrigeration cycle 10 of the present embodiment, shown in a schematic diagram of FIG. 1, is used for a vehicular air conditioner and functions to cool a blown air blown into a vehicle compartment that is an air-conditioning target space. The ejector-type refrigeration cycle 10 is capable of switching a refrigerant flow path between a refrigerant flow path (first refrigerant flow path) in a normal operation mode described later and a refrigerant flow path (second refrigerant flow path) in a low-load operation mode. In FIG. 1, the first refrigerant flow path is shown by solid arrows while the second refrigerant flow path is shown by dashed arrows.

In the ejector-type refrigeration cycle 10, HFC refrigerant (e.g., R134a) is used as the refrigerant. The ejector-type refrigeration cycle 10 is a subcritical refrigeration cycle in which a high pressure-side refrigerant pressure does not exceed a subcritical pressure of the refrigerant. HFO-system refrigerant (e.g., R1234yf) may be adopted as the refrigerant. The refrigerant contains refrigerator oil for lubrication of a compressor 11. A part of the refrigerator oil circulates in the cycle together with the refrigerant.

In the ejector-type refrigeration cycle 10, the compressor 11 draws in the refrigerant, pressurizes the refrigerant to be a high-pressure refrigerant, and discharges the high-pressure refrigerant. More specifically, the compressor 11 of the present embodiment is an electric compressor that includes a fixed capacity compression mechanism and an electric motor driving the compression mechanism. The compression mechanism and the electric motor are housed in a single housing.

A variety of compression mechanisms, such as a scroll-type compression mechanism or a vane-type compression mechanism, may be adopted as the compression mechanism. An operation (rotation rate) of the electric motor is controlled by a control signal outputted from an air-conditioning controller 21 described later. An alternating-current motor or a direct-current motor may be adopted as the electric motor.

The compressor 11 may be an engine-driven compressor that is driven by a rotational driving force transmitted from a vehicle-running engine through a pulley and a belt, for example. Adopted as such kind of engine-driven compressor may be a variable capacity compressor that is adjustable in refrigerant discharge capacity in accordance with change in discharge capacity, or a fixed capacity compressor that adjusts a refrigerant discharge capacity by changing an operation rate of the compressor via connection or disconnection of an electromagnetic clutch can be adopted.

A discharge port of the compressor 11 is connected to a refrigerant inlet of a condenser portion 12a of a radiator 12. The radiator 12 is a heat-radiation heat exchanger that causes the high-pressure refrigerant to radiate heat and be cooled via heat exchange between the high-pressure refrigerant discharged from the compressor 11 and an air (outside air) blown by a cooling fan 12d from outside of a vehicle compartment.

More specifically, the radiator 12 includes the condenser portion 12a that causes high-pressure gas-phase refrigerant to radiate heat and be condensed via heat exchange between the high-pressure gas-phase refrigerant discharged from the compressor 11 and the outside air blown by the cooling fan 12d. The radiator 12 includes a receiver portion 12b that is a high pressure-side gas-liquid separator which separates gas and liquid of the refrigerant flowing out of the condenser portion 12a and accumulates surplus liquid-phase refrigerant. The radiator 12 includes a subcooling portion 12c that subcools the liquid-phase refrigerant via heat exchange between the liquid-phase refrigerant flowing out of the receiver portion 12b and the outside air blown by the cooling fan 12d. The radiator 12 is a so-called subcool-type condenser.

The cooling fan 12d is an electric blower in which a rotation rate (air blowing amount) is controlled by a control voltage outputted from the air-conditioning controller 21.

A refrigerant outlet of the subcooling portion 12c of the radiator 12 is connected to a refrigerant inflow port side of a nozzle portion 20a of an ejector 20. The ejector 20 functions as a refrigerant depressurizing device that depressurizes the high-pressure liquid-phase refrigerant flowing out of the radiator 12 in a subcooled state to flow downstream. The ejector 20 functions also as a refrigerant circulating device (refrigerant transfer device) that draws (transfers) and circulates a refrigerant flowing out of an evaporator 16 described later by a suction action of an ejection refrigerant ejected at high speed.

More specifically, the ejector 20 includes the nozzle portion 20a and a body portion 20b. The nozzle portion 20a is made of metal (e.g., stainless alloy) having an approximately circular-cylindrical shape that is gradually tapered along a flow direction of the refrigerant. The nozzle portion 20a depressurizes and expands the refrigerant isentropically in a refrigerant passage (narrowing passage) provided inside the nozzle portion 20a.

The refrigerant passage provided inside the nozzle portion 20a includes a throat part (minimum area portion) reduced mostly in passage cross-sectional area, a tapered part in which a passage cross-sectional area decreases gradually from the refrigerant inflow port side to the throat part, and an expansion part in which the passage cross-sectional area increases gradually from the throat part to a refrigerant ejection port through which the refrigerant is ejected. The nozzle portion 20a of the present embodiment constitutes a de Laval nozzle.

In the present embodiment, adopted as the nozzle portion 20a is one in which a flow speed of the ejection refrigerant ejected from the refrigerant ejection port is higher than or equal to a sound speed in the normal operation of the ejector-type refrigeration cycle 10. The nozzle portion 20a may include a tapered nozzle.

The body portion 20b is made of metal (e.g., aluminum) or resin with having an approximately circular-cylindrical shape. The body portion 20b functions as a fixing member that supports and fixes therein the nozzle portion 20a, while functioning as an outer shell of the ejector 20. More specifically, the nozzle portion 20a is fixed by press-fitting to be housed inside an end part of the body portion 20b in its longitudinal direction. Hence, the refrigerant can be prevented from leaking out from a fixed part (press-fitted part) between the nozzle portion 20a and the body portion 20b.

Provided at a position on an outer peripheral surface of the body portion 20b, which is located on a radially-outer side of the nozzle portion 20a, is a refrigerant suction port 20c that communicates with the refrigerant ejection port of the nozzle portion 20a from outside to inside of the body portion 20b. The refrigerant suction port 20c is a through-hole through which the refrigerant flowing out of the evaporator 16 described later is drawn into the ejector 20 by the suction action of the ejection refrigerant ejected from the nozzle portion 20a.

Further, a suction passage and a diffuser portion 20d are provided inside the body portion 20b. The suction passage introduces a suction refrigerant, which is drawn from the refrigerant suction port 20c, into the refrigerant ejection port of the nozzle portion 20a. The diffuser portion 20d is provided as an example of a pressurizing portion that mixes and pressurizes the ejection refrigerant and the suction refrigerant which has flowed into the ejector 20 from the refrigerant suction port 20c through the suction passage.

The suction passage is a space between an outer peripheral side of a tapered end part of the nozzle portion 20a and an inner peripheral side of the body portion 20b. A passage cross-sectional area of the suction passage gradually decreases along the flow direction of the refrigerant. Accordingly, a flow speed of the suction refrigerant flowing through the suction passage is increased, and an energy loss (mixing loss) in the mixing of the suction refrigerant and the ejection refrigerant in the diffuser portion 20d is reduced.

The diffuser portion 20d is disposed to communicate with an outlet of the suction passage and is a space gradually increasing in passage cross-sectional area. Accordingly, while mixing the ejection refrigerant and the suction refrigerant, the diffuser portion 20d reduces their flow speeds and increases a pressure of mixture refrigerant of the ejection refrigerant and the suction refrigerant. In other words, the diffuser portion 20d functions to convert a velocity energy of the mixture refrigerant into a pressure energy.

More specifically, an inner peripheral wall surface of the body portion 20b that defines the diffuser portion 20d of the present embodiment has a cross-sectional shape formed by combining multiple curved lines perpendicular to an axial direction. A degree of expansion of the diffuser portion 20d in passage cross-sectional area gradually increases and then decreases again along the flow direction of the refrigerant. Therefore, the refrigerant can be pressurized in an isentropic manner.

A refrigerant outlet of the diffuser portion 20d of the ejector 20 is connected to an inlet side of a gas-liquid separator 15 through an opening-closing valve 14.

The gas-liquid separator 15 is an example of a gas-liquid separation device that separates gas and liquid of refrigerant flowing out of the diffuser portion 20d of the ejector 20. In the present embodiment, adopted as the gas-liquid separator 15 is one which has a relatively low volume so as to discharge a liquid-phase refrigerant from a liquid-phase refrigerant outflow port without accumulating much the separated liquid-phase refrigerant therein. However, one having a function as a liquid storage device that accumulates therein a surplus liquid-phase refrigerant of the cycle may be adopted as the gas-liquid separator 15.

The opening-closing valve 14 is disposed in a refrigerant passage connecting an outlet side of the diffuser portion 20*d* of the ejector 20 and an inlet side of the gas-liquid separator 15. The opening-closing valve 14 is an example of an opening-closing device that opens or closes the refrigerant passage. Therefore, in the ejector-type refrigeration cycle 10 of the present embodiment, the opening-closing valve 14 opens or closes the refrigerant passage that connects the outlet side of the diffuser portion 20*d* of the ejector 20 and the inlet side of the gas-liquid separator 15, thereby switching a refrigerant flow path for the refrigerant circulating the cycle.

The opening-closing valve 14 of the present embodiment may be used as an example of a refrigerant flow-path switching device. More specifically, in the present embodiment, when the opening-closing valve 14 is opened in the normal operation mode described later, the first refrigerant flow path is selected in which the ejection refrigerant ejected from the nozzle portion 20*a* of the ejector 20 flows out of the diffuser portion 20*d*. When the opening-closing valve 14 is closed in the low-load operation mode, the second refrigerant flow path is selected in which the ejection refrigerant flows out of the refrigerant suction port 20*c*.

The opening-closing valve 14 of the present embodiment includes a non-energization open-type electromagnetic valve (so-called normally-open valve). An operation of the opening-closing valve 14 is controlled by a control voltage outputted from the air-conditioning controller 21.

A gas-phase refrigerant outflow port of the gas-liquid separator 15 is connected to a suction port side of the compressor 11. On the other hand, the liquid-phase refrigerant outflow port of the gas-liquid separator 15 is connected to the refrigerant suction port 20*c* of the ejector 20.

Moreover, a fixed throttle 15*a* and the evaporator 16 are disposed in a refrigerant passage which connects the liquid-phase refrigerant outflow port of the gas-liquid separator 15 and the refrigerant suction port 20*c* of the ejector 20. The fixed throttle 15*a* and the evaporator 16 are arranged in the refrigerant passage in this order in a direction from the gas-liquid separator 15 toward the refrigerant suction port 20*c* of the ejector 20. The fixed throttle 15*a* is a depressurizing device that depressurizes the refrigerant and may employ an orifice, a capillary tube or a nozzle, for example.

The evaporator 16 is a heat-absorption heat exchanger that causes a low-pressure refrigerant flowing therein to exchange heat with the blown air blown from the blower fan 16*a* toward the vehicle compartment and to evaporate and exert a heat absorption action. A blower fan 16*a* is an electric blower in which a rotation rate (air blowing amount) is controlled by a control voltage outputted from the air-conditioning controller 21.

Next, the air-conditioning controller 21 includes a microcomputer including a CPU, a ROM and RAM, and a peripheral circuit. The air-conditioning controller 21 performs a variety of calculations and processing based on a control program stored in the ROM, thereby controlling operations of the above-described various electric actuators 11, 12*d*, 14 and 16*a*, for example.

The air-conditioning controller 21 is connected to an air-conditioning control sensor group that includes an inside air sensor which detects a temperature Tr in the vehicle compartment, an outside air temperature sensor which detects a temperature Tam of the outside air, a solar radiation sensor which detects a solar radiation amount As in the vehicle compartment, an evaporator temperature sensor which detects a temperature Tefin (more specifically, an evaporator temperature) of air blown out of the evaporator 16, an outlet-side temperature sensor which detects a temperature Td of refrigerant on an outlet side of the radiator 12, and an outlet-side pressure sensor which detects a pressure Pd of the refrigerant on the outlet side of the radiator 12. Detection values of the sensor group are input to the air-conditioning controller 21.

Further, an input side of the air-conditioning controller 21 is connected to a non-shown operational panel disposed near to an instrumental panel located in a front part of the vehicle compartment. Operational signals from a variety of operational switches provided in the operational panel are inputted into the air-conditioning controller 21. The variety of operational switches include an air-conditioning activation switch for requiring air conditioning in the vehicle compartment, and a vehicle-compartment temperature setting switch for setting a temperature in the vehicle compartment.

The air-conditioning controller 21 of the present embodiment incorporates control portions that control the variety of controlled devices connected to the output side of the air-conditioning controller 21. Portions (hardware and software) of the air-conditioning controller 21 that control an operation of each controlled device constitutes the control portion of each controlled device. For example, in the present embodiment, a portion controlling an operation of the compressor 11 constitutes a discharge capacity control portion 21*a*, and a portion controlling an operation of the opening-closing valve 14 constitutes a refrigerant flow-path control portion 21*b*.

Next, an operation of the ejector-type refrigeration cycle 10 of the present embodiment will be described. As described above, the ejector-type refrigeration cycle 10 of the present embodiment is capable of switching between an operation under the normal operation mode and an operation under the low-load operation mode.

The normal operation mode is an operation mode that is performed in a normal time when the ejector 20 is capable of delivering a sufficient suction performance. The low-load operation mode is an operation mode that is performed in a low-load operation time when a thermal load on the cycle is likely to reduce to be lower than that in the normal operation. In the low-load operation time, a flow rate of the ejection refrigerant ejected from the nozzle portion 20*a* of the ejector 20 may reduce, and accordingly, the suction performance of the ejector 20 may reduce largely.

Moreover, switching between the normal operation mode and the low-load operation mode is performed by execution of an air-conditioning control program that is stored in a memory circuit of the air-conditioning controller 21 in advance. The air-conditioning control program is executed when the air-conditioning activation switch of the operational panel is turned on.

According to a control routine of the air-conditioning control program, detection signals of the above-described air-conditioning sensor group and operational signals from the variety of air-conditioning switches are read in, and a target air blowing temperature TAO that is a target temperature of the blown air blown into the vehicle compartment is calculated based on the read-in detection signals and the read-in operational signals.

Further, control states of the electric actuators, such as the compressor 11, the cooling fan 12*d* and the opening-closing valve 14, are determined based on the calculated target air blowing temperature TAO and the detection signals. Control signals are outputted to the variety of electric actuators so as to realize the determined control states. Until termination of the air conditioning in the vehicle compartment is required, such routine: reading-in of the detection signals and the operational signals→calculation of the target air blowing temperature TAO→determination of a new control state-→output of the control signal, is repeatedly performed.

With respect to the determination of the control states of the variety of electric actuators, for example, a refrigerant discharge performance of the compressor 11, i.e. a rotation rate Nc of the compressor 11, more specifically, a control signal outputted to an electric motor of the compressor 11 is determined as below. The refrigerant discharge performance of the compressor 11 can be defined as an integrated value of a discharge pressure of the compressor 11 and a discharge flow rate (mass flow rate) of the compressor 11.

First, a target evaporator blowing temperature TEO of the evaporator 16 is determined based on the target air blowing temperature TAO with reference to a control map that is stored in the memory circuit of the air-conditioning controller 21 in advance. More specifically, the target evaporator blowing temperature TEO is determined to decrease with decrease of the target air blowing temperature TAO.

The control signal outputted to the electric motor of the compressor 11 is determined based on a deviation (Tefin-TEO) between the target evaporator blowing temperature TEO and the evaporator temperature Tefin detected by the evaporator temperature sensor by a feedback control method such that the evaporator temperature Tefin approach the target evaporator blowing temperature TEO.

An air blowing performance of the blowing fan 16a (more specifically, a control voltage outputted to the blower fan 16a) is determined based on the target air blowing temperature TAO with reference to a control map that is stored in the memory circuit of the air-conditioning controller 21 in advance. More specifically, the control voltage outputted to the electric motor is set at maximum and an air blowing amount is controlled to be close to a maximum amount in an extremely-low temperature range (maximally cooling range) or an extremely-high temperature range (maximally heating range) of the target air blowing temperature TAO. The control voltage is reduced in accordance with approaching of the target air blowing temperature TAO to a middle temperature range.

The open-closed state of the opening-closing valve 14 (more specifically, a control voltage outputted to the opening-closing valve 14) is determined such that the opening-closing valve 14 is determined to be closed when the rotation rate Nc of the compressor 11 determined as described above is lower than or equal to a predetermined standard rotation rate KNc. In other words, in the ejector-type refrigeration cycle 10 of the present embodiment, when the rotation rate Nc of the compressor 11 becomes lower than or equal to the predetermined standard rotation rate KNc, the first refrigerant flow path is switched to the second refrigerant flow path.

The standard rotation rate KNc is determined such that when the first refrigerant flow path is selected in the ejector-type refrigeration cycle 10, and when the rotation rate Nc of the compressor 11 is higher than the standard rotation rate KNc, a flow rate of the ejection refrigerant ejected from the nozzle portion 20a does not decrease, and the refrigerant downstream of the evaporator 16 can be sufficiently drawn through the refrigerant suction port 20c.

The above-described target air blowing temperature TAO is a value determined for maintaining a temperature in the vehicle compartment at a set temperature Tset that corresponds to a temperature desired by an occupant. Thus, in the ejector-type refrigeration cycle 10 that cools the blown air in the evaporator 16 according to the present embodiment, a thermal load on the cycle increases in accordance with decrease in target air blowing temperature TAO.

Additionally, the evaporator temperature Tefin is a temperature of the evaporator 16 itself, and thus is substantially equivalent to a refrigerant evaporation temperature in the evaporator 16. Further, the evaporator temperature Tefin reduces by increasing the rotation rate Nc (refrigerant discharge performance) of the compressor 11.

Therefore, determination by the air-conditioning controller 21 such that the target evaporator temperature TEO decreases with decrease in target air blowing temperature TAO means determination such that the refrigerant discharge performance (the rotation rate Nc of the compressor 11) of the compressor 11 increases with increase in thermal load of the cycle.

Hence, like the present embodiment, closing of the opening-closing valve 14 when the rotation rate Nc of the compressor 11 becomes lower than or equal to the standard rotation rate KNc means controlling of an actuation of the opening-closing valve 14 such that the first refrigerant flow path (normal operation mode) is switched to the second refrigerant flow path (low-load operation mode) when the thermal load of the cycle is lower than or equal to a predetermined standard load.

In the ejector-type refrigeration cycle 10 of the present embodiment, when the thermal load of the cycle is higher than the standard thermal load, and when the ejector 20 is capable of delivering a sufficient suction performance, the first refrigerant flow path (normal operation mode) is selected. When the thermal load of the cycle is lower than or equal to the standard thermal load, and when the low-load operation in which the suction performance of the ejector 20 may reduce largely is performed, the second refrigerant flow path (low-load operation mode) is selected.

Next, a control operation of each operation mode will be described.

(a) Normal Operation Mode

The normal operation mode is performed when the opening-closing valve 14 is open and the first refrigerant flow path is selected.

In the ejector-type refrigeration cycle 10 selecting the first refrigerant flow path, as shown by solid arrows in FIG. 1, an ejector-type refrigeration cycle is obtained, in which the refrigerant circulates in an order: the compressor 11→the radiator 12→the nozzle portion 20a of the ejector 20→the pressurizing portion 20d of the ejector 20 (→the opening-closing valve 14)→the gas-liquid separator 15→the compressor 11, while the refrigerant circulates in an order: the gas-liquid separator 15→the fixed throttle 15a→the evaporator 16→the refrigerant suction port 20c of the ejector 20.

In this refrigeration cycle, the high-pressure refrigerant discharged from the compressor 11 flows into the condenser portion 12a of the radiator 12 and exchanges heat with the outside air blown by the cooling fan 12d, thereby radiating heat and condensing. The refrigerant that has radiated heat in the condenser portion 12a is separated by the receiver portion 12b into gas and liquid. The liquid-phase refrigerant after the gas-liquid separation in the receiver portion 12b exchanges heat with the outside air blown by the cooling fan 12d in the subcooling portion 12c, thereby further radiating heat to become a subcooled liquid-phase refrigerant.

The subcooled liquid-phase refrigerant flowing out of the subcooling portion 12c of the radiator 12 flows into the nozzle portion 20a of the ejector 20 to be depressurized in an isentropic manner and ejected. Further, in the normal operation mode, the opening-closing valve 14 is open, and the thermal load of the cycle is higher than the standard thermal load. Hence, the suction action of the ejection refrigerant causes a refrigerant flowing out of the evaporator 16 to be drawn into the ejector 20 through the refrigerant suction port 20c.

The suction refrigerant drawn through the refrigerant suction port 20c flows into the diffuser portion 20d of the ejector 20 together with the ejection refrigerant. In the diffuser portion 20d, the expansion in passage cross-sectional area causes a kinetic energy of the refrigerant to be converted into a pressure energy. Accordingly, the ejection refrigerant and the suction refrigerant are mixed while a pressure of the mixture refrigerant increases. The refrigerant flowing out of the outlet part of the diffuser portion 20d flows into the gas-liquid separator 15 to be separated into gas and liquid.

The liquid-phase refrigerant flowing out of the liquid-phase refrigerant outflow port of the gas-liquid separator 15 is depressurized isentropically in the fixed throttle 15a and flows into the evaporator 16. The refrigerant flowing into the evaporator 16 evaporates by absorbing heat from the blown air blown by the blower fan 16a. Accordingly, the blown air that is to be blown into the vehicle compartment is cooled. Moreover, the refrigerant flowing out of the evaporator 16 is drawn into the ejector 20 through the refrigerant suction port 20c. On the other hand, the gas-phase refrigerant flowing out of the gas-liquid separator 15 is sucked into the compressor 11 and newly compressed.

In the normal operation mode, via the above-described operation, the blown air that is to be blown into the vehicle compartment can be cooled in the evaporator 16. Since the thermal load of the cycle is higher than the standard thermal load, the suction performance of the ejector 20 can be prevented from decreasing, and the low-pressure refrigerant separated by the gas-liquid separator 15 can be made to flow into the evaporator 16 certainly.

In addition, the refrigerant pressurized in the diffuser portion 20d of the ejector 20 can be drawn into the compressor 11. Thus, a driving force of the compressor 11 can be reduced, and a cycle efficiency (COP) can be improved therefore.

(b) Low-Load Operation Mode

The low-load operation mode is performed when the opening-closing valve 14 is closed and the second refrigerant flow path is selected.

In the ejector-type refrigeration cycle 10 selecting the second refrigerant flow path, as shown by dashed arrows in FIG. 1, a refrigeration cycle is obtained, in which the refrigerant circulates in an order: the compressor 11→the radiator 12→the nozzle portion 20a of the ejector 20→the refrigerant suction port 20c of the ejector 20→the evaporator 16→the fixed throttle 15a→the gas-liquid separator 15→the compressor 11.

In this refrigeration cycle, the high-pressure refrigerant discharged from the compressor 11 is, similarly to the case where the first refrigerant flow path is selected, cooled in the radiator 12, depressurized in the nozzle portion 20a of the ejector 20, and ejected. Further, when the second refrigerant flow path is selected, the opening-closing valve 14 is closed. Thus, the ejection refrigerant flows out from the refrigerant suction port 20c toward the evaporator 16 without flowing out from the diffuser portion 20d.

The refrigerant flowing into the evaporator 16, similarly to the case where the first refrigerant flow path is selected, absorbs heat from the blown air blown by the blower fan 16a to evaporate. Accordingly, the blown air is cooled. Moreover, the refrigerant flowing out of the evaporator 16 flows in a direction opposite to a flow direction of the case where the first refrigerant flow path is selected, and flows into the gas-liquid separator 15 through the fixed throttle 15a. The gas-phase refrigerant separated in the gas-liquid separator 15 is sucked into the compressor 11 to be compressed newly.

In the low-load operation mode, via the above-described operation, the blown air that is to be blown into the vehicle compartment can be cooled in the evaporator 16. Even when the rotation rate Nc of the compressor 11 is lower than or equal to the standard rotation rate KNc, the ejection refrigerant ejected from the nozzle portion 20a of the ejector 20 can be made to flow into the evaporator 16 through the refrigerant suction port 13c. Thus, the low-pressure refrigerant can be surely made to flow into the evaporator 16 by the refrigerant discharge performance of the compressor 11.

In a cycle configuration like the ejector-type refrigeration cycle 10 selecting the first refrigerant flow path, in which the refrigerant flowing downstream of the evaporator 16 is drawn by the suction action of the ejection refrigerant ejected from the nozzle portion 20a of the ejector 20, when the flow rate of the ejection refrigerant is reduced, a degree of reduction in suction performance of the ejector 20 to suck the refrigerant on a downstream side of the evaporator 16 through the refrigerant suction port 20c of the ejector 20 is likely to be larger than a degree of reduction in flow rate of the ejection refrigerant.

Hence, if the thermal load of the cycle decreases, and if the flow rate of the ejection refrigerant decreases, the suction performance of the ejector 20 may reduce largely, and the liquid-phase refrigerant separated by the gas-liquid separator 15 may be incapable of flowing into the evaporator 16 through the fixed throttle 15a. Therefore, when a load on the cycle is low, a cooling target fluid may not be able to be cooled in the evaporator 16.

In contrast, according to the ejector-type refrigeration cycle 10 of the present embodiment, the first refrigerant flow path (normal operation mode) is switched to the second refrigerant flow path (low-load operation mode) in the low-load operation where the flow rate of the ejection refrigerant may decrease and the refrigerant suction performance of the ejector 20 may possibly reduce largely accordingly. Therefore, the refrigerant can be made to flow into the evaporator 16 regardless of variation in load on the cycle, and the blown air can be cooled sufficiently.

According to the ejector-type refrigeration cycle 10 of the present embodiment, when either flow path is selected, the refrigerant depressurized in the nozzle portion 20a of the ejector 20 can be made to flow into the evaporator 16. Hence, it is not necessary to add a special refrigerant depressurizing device that is used only when the second refrigerant flow path is selected.

Further, according to the present embodiment, when the rotation rate Nc of the compressor 11 is lower than or equal to the standard rotation rate KNc, the air-conditioning controller 21 closes the opening-closing valve 14. Thus, in the low-load operation, the first refrigerant flow path (normal operation mode) can be surely switched to the second refrigerant flow path (low-load operation mode). Therefore, even in the low-load operation, the cooling target fluid can be cooled certainly.

Second Embodiment

In the first embodiment, the opening-closing valve 14 disposed in the refrigerant passage connecting the outlet side of the diffuser portion 20d of the ejector 20 and the inlet side of the gas-liquid separator 15 is explained as an example of the refrigerant flow-path switching device. However, the refrigerant flow-path switching device is not limited to this. For example, the refrigerant switching device may employ an opening-closing device that opens or closes a refrigerant passage that extends from an inlet side of a diffuser portion 20d to an inlet side of a gas-liquid separator 15.

Figure 2:
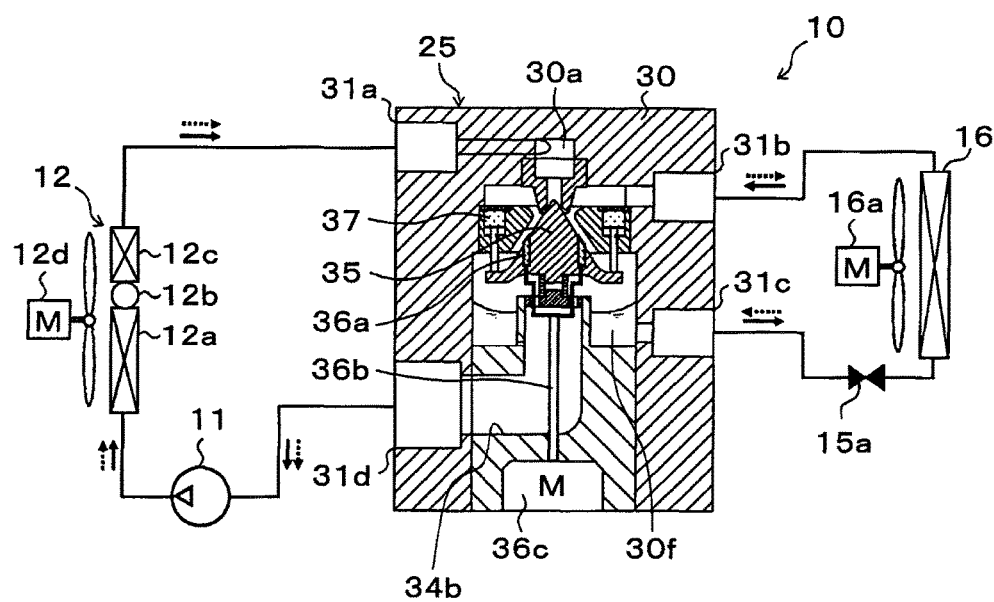
FIG. 2 is a schematic diagram showing an ejector-type refrigeration cycle according to a second embodiment of the present disclosure.

In an ejector-type refrigeration cycle 10 according to a present embodiment, as shown in a schematic diagram of FIG. 2, a gas-liquid separator-integrated ejector 25 is adopted while the ejector 20, the opening-closing valve 14 and the gas-liquid separator 15 are omitted as compared to the first embodiment.

In other words, the ejector 25 of the present embodiment functions not only as the refrigerant depressurizing device and the refrigerant circulating device (refrigerant transfer device), but also as an opening-closing device (refrigerant flow-path switching device), which opens or closes the refrigerant passage extending from the inlet side of the diffuser portion 20d to the inlet side of the gas-liquid separator 15, and a gas-liquid separator which separates a depressurized refrigerant into gas and liquid. Therefore, the ejector 25 of the present embodiment is one in which the ejector 20, the opening-closing valve 14 and the gas-liquid separator 15 of the first embodiment are integrated with each other.

In FIG. 2, a part the same as or equivalent to a part of the first embodiment is assigned the same reference numeral. In FIG. 2, for clarity of the drawings, an air-conditioning controller 21 and electric signal lines connecting the air-conditioning controller 21 and a variety of electric actuators are omitted in the drawings. This is applied to the following drawings. In FIG. 2, the first refrigerant flow path is shown by solid arrows, and the second refrigerant flow path is shown by dashed arrows.

Figure 3:
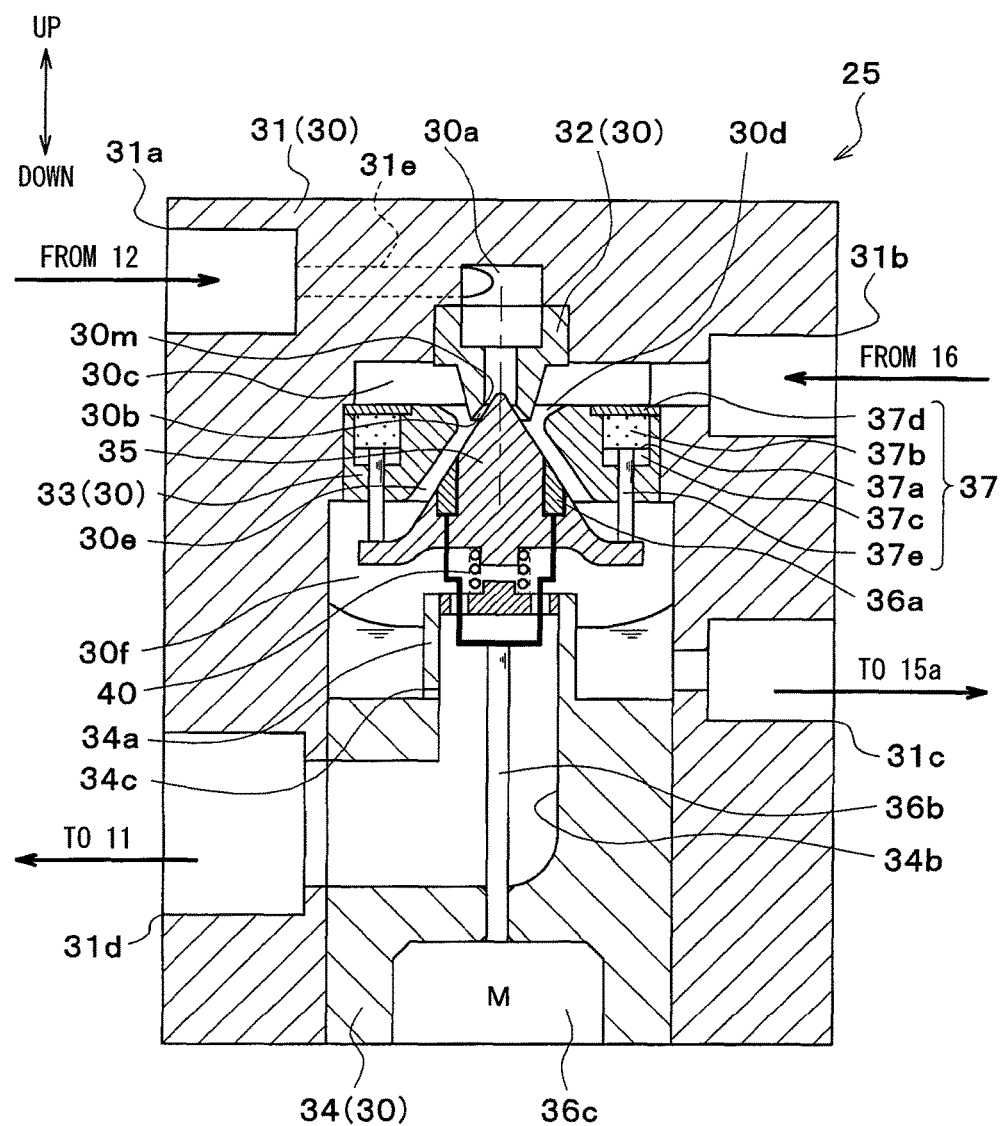
FIG. 3 is a sectional diagram showing an ejector in a normal operation mode, according to the second embodiment.
Figure 4:
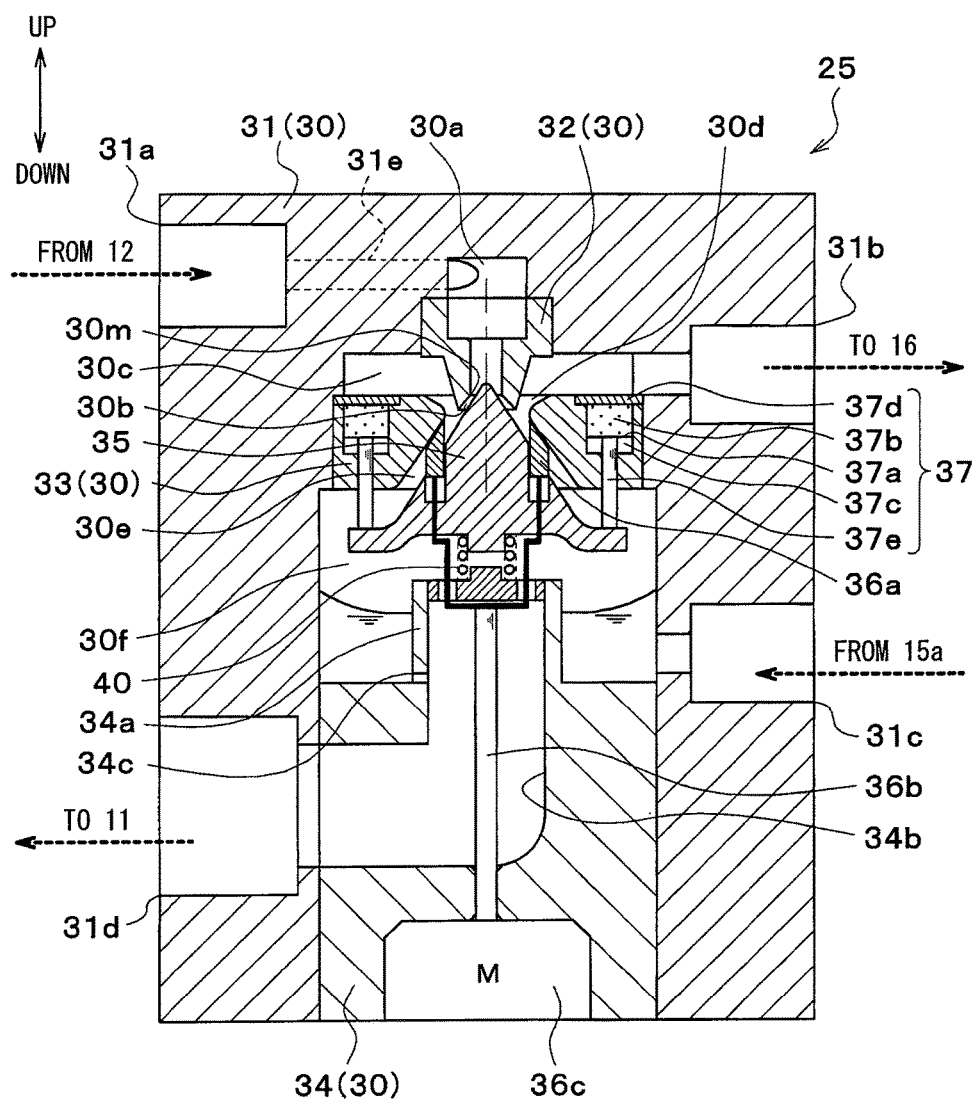
FIG. 4 is a sectional diagram showing an ejector in a low-load operation mode, according to the second embodiment.
Figure 5:
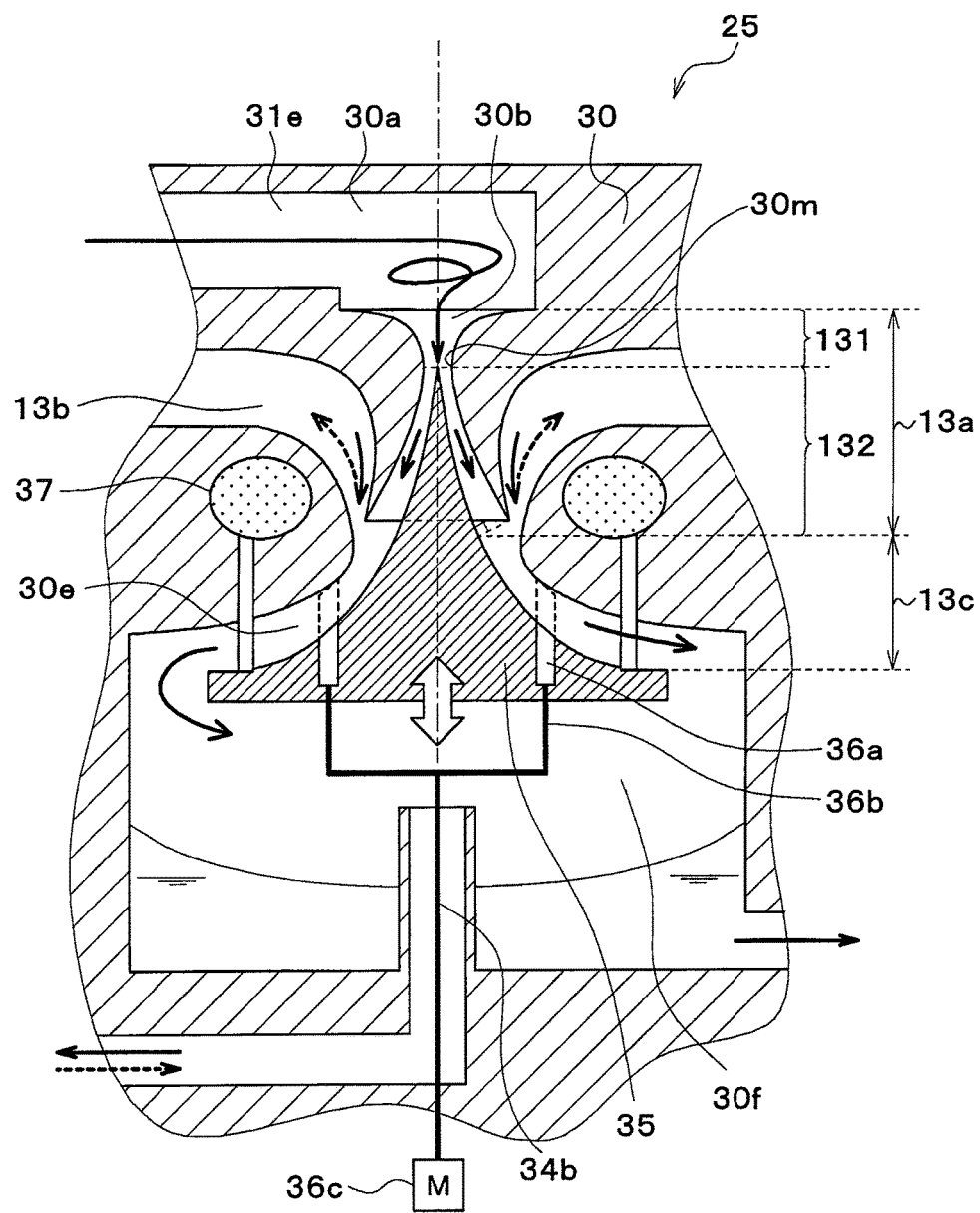
FIG. 5 is a schematic sectional diagram illustrating a function of each refrigerant passage of the ejector according to the second embodiment.

A specific configuration of the ejector 25 will be described with reference to the FIGS. 3 to 5. Each up-down arrow in FIGS. 3 and 4 shows up and down directions in a state where the ejector-type refrigeration cycle 10 is installed into an air conditioner for a vehicle. FIG. 5 is a schematic sectional diagram for explanation of each refrigerant passage in the ejector 25, and a part serving the same function as a part of FIGS. 3 and 4 is assigned the same numeral.

The ejector 25 of the present embodiment, as shown in FIGS. 3 and 4, includes a body 30 in which multiple components are combined. More specifically, the body 30 includes a housing body 31 which is made of a prismatic or circular-cylindrical metal or a resin and functions as an outer shell of the ejector 25. A nozzle body 32, a middle body 33 and a lower body 34, for example, are fixed inside the housing body 31.

The housing body 31 includes a refrigerant inflow port 31a into which a refrigerant flowing out of a radiator 12 flows, a refrigerant suction port 31b into which a refrigerant flowing out of an evaporator 16 is sucked when the first refrigerant flow path is selected, a liquid-phase refrigerant outflow port 31c from which a liquid-phase refrigerant separated in a later-described gas-liquid separation space 30f flows out toward the evaporator 16 when the first refrigerant flow path is selected, and a gas-phase refrigerant outflow port 31d from which a gas-phase refrigerant separated in the gas-liquid separation space 30f flows out toward a suction port of a compressor 11.

The nozzle body 32 is formed of, for example, a metal member having an approximately conical shape tapered in a flow direction of refrigerant. The nozzle body 32 is fixed inside the housing body 31 by a method such as press-fitting such that an axial direction of the nozzle body 32 is parallel to a vertical direction (up-down direction in FIGS. 3 and 4). Provided between an upper side of the nozzle body 32 and the housing body 31 is a swirl space 30a in which a refrigerant flow from the refrigerant inflow port 31a swirls.

The swirl space 30a has a shape of a body of revolution, and a center axis of the swirl space 30a, shown by an alternate long and short dash line in FIGS. 3 and 4, extends in the vertical direction. The shape of a body of revolution is a solid shape formed by rotating a plane figure about a single linear line (center axis). More specifically, the swirl space 30a of the present embodiment has an approximately circular-cylindrical shape. Alternatively, the swirl space 30a may have, for example, a shape obtained by bonding a circular cone or a circular truncated cone to a circular cylinder.

Further, a refrigerant inflow passage 31e connecting the refrigerant inflow port 31a and the swirl space 30a extends in a direction of a tangent to an inner wall surface of the swirl space 30a when viewed in a direction along the center axis of the swirl space 30a. Accordingly, the refrigerant flowing from the refrigerant inflow passage 31e into the swirl space 30a flows along the inner wall surface of the swirl space 30a and swirls inside the swirl space 30a.

The refrigerant inflow passage 31e is not necessarily exactly fit to the direction of the tangent to the swirl space 30a when viewed in the direction along the center axis of the swirl space 30a, and may include a component parallel to another direction (e.g. a component along the axial direction of the swirl space 30a) as long as the refrigerant inflow passage 31e includes a component parallel to the direction of the tangent to the swirl space 30a.

Since the refrigerant swirling in the swirl space 30a is subjected to a centrifugal force, a refrigerant pressure on a center-axis side becomes lower than a refrigerant pressure on a radially outer side in the swirl space 30a. Hence, in the present embodiment, in a normal operation of the ejector-type refrigeration cycle 10, the refrigerant pressure on the center-axis side in the swirl space 30a is reduced to a pressure at which the refrigerant boils due to the pressure reduction (i.e. cavitation is generated).

Such adjustment of the refrigerant pressure on the center-axis side in the swirl space 30a can be achieved by adjustment of a swirling speed of the refrigerant swirling in the swirl space 30a. Further, the adjustment of the swirling speed can be performed, for example, by adjustment of an area ratio between a passage cross-sectional area of the refrigerant inflow passage 31e and a cross-sectional area of the swirl space 30a perpendicular to the axial direction. The swirling speed of the present embodiment means a flow speed in a swirling direction of the refrigerant adjacent to an outermost circumferential part of the swirl space 30a.

Additionally, provided inside the nozzle body 32 is a depressurizing space 30b in which the refrigerant flowing out of the swirl space 30a is depressurized and flows out downstream. The depressurizing space 30b has a shape of body of revolution, in which a circular cylindrical shape and a circular truncated conical shape are bonded to each other. The circular truncated conical shape gradually expanding in a flow direction of the refrigerant continuously from a lower side of the circular cylindrical shape. A center axis of the depressurizing space 30b and the center axis of the swirl space 30a are coaxial.

Moreover, a passage forming member 35 is disposed inside the depressurizing space 30b. The passage forming member 35 provides a narrowest area part 30m having a passage cross-sectional area that is most-reduced in the depressurizing space 30b while the passage forming member 35 changes the passage cross-sectional area of the narrowest area part 30m. The passage forming member 35 has an approximately circular conical shape that gradually expands along a direction toward downstream in a refrigerant flow. The center axis of the passage forming member 35 is arranged coaxially with the center axis of the depressurizing space 30b. In other words, the passage forming member 35 has a circular conical shape in which a cross-sectional area increases with distance from the depressurizing space 30b.

The depressurizing space 30b, as shown in FIG. 5, includes a narrowing part 131 and a widening part 132 between an inner circumferential surface of the nozzle body 32 and an upper and outer circumferential surface of the passage forming member 35. The narrowing part 131 is formed on an upstream side of the narrowest area part 30m in the refrigerant flow, and a passage cross-sectional area of the narrowing part 131 gradually decreases toward the narrowest area part 30m. The widening part 132 is formed on a downstream side of the narrowest area part 30m in the refrigerant flow, and a passage cross-sectional area of the widening part 132 gradually increases with distance from the narrowest area part 30m.

On a downstream side of the narrowing part 131 and in the widening part 132, the depressurizing space 30b overlap the passage forming member 35 in a radial direction, thereby having an annular shape (i.e. a doughnut shape obtained by removing a smaller-diameter circular shape from a larger-diameter circular shape) on a cross-sectional plane perpendicular to an axial direction of the refrigerant passage.

Further, in the present embodiment, the inner circumferential surface of the nozzle body 32, which defines the depressurizing space 30b, and the outer circumferential surface of the passage forming member 35 are formed such that the passage cross-sectional area gradually increases toward a downstream side in the refrigerant flow in the widening part 132.

In the present embodiment, according to such passage shape, as shown in FIG. 5, a refrigerant passage formed between the inner circumferential surface defining the depressurizing space 30b and the outer circumferential surface of a vertex part of the passage forming member 35 is used as a nozzle passage 13a that functions similar to the refrigerant passage formed in the nozzle portion 20a described in the first embodiment. In addition, in the nozzle passage 13a, the refrigerant is depressurized. A flow speed of the refrigerant in the gas-liquid two-phase state is enhanced to be higher than a two-phase sonic speed, and the refrigerant is ejected.

The refrigerant passage between the inner circumferential surface defining the depressurizing space 30b and the outer circumferential surface of the vertex part of the passage forming member 35 according to the present embodiment is, as shown in FIG. 5, a refrigerant passage includes an area where a line segment extending in a normal direction from the outer circumferential surface of the passage forming member 35 crosses a part of the nozzle body 32 that defines the depressurizing space 30b.

Since the refrigerant flowing into the nozzle passage 13a swirls in the swirl space 30a, both the refrigerant flowing through the nozzle passage 13a and the ejection refrigerant ejected from the nozzle passage 13a have a component of velocity in the same direction as a swirling direction of the refrigerant that swirls in the swirl space 30a.

Next, the middle body 33 shown in FIGS. 3 and 4 is formed of a metallic circular plate-shaped member and has a through hole in a center part of the middle body 33. The through-hole extends through the middle body 33 and has a shape of a body of revolution. The middle body 33 houses a drive device 37 that is located on a radially outer side of the through-hole and changes a position of the passage forming member 35. The center axis of the through-hole of the middle body 33 is positioned coaxially with the center axes of the swirl space 30a and the depressurizing space 30b. The middle body 33 is fixed inside the housing body 31 and on a lower side of the nozzle body 32 by a method such as press-fitting.

Further, an inflow space 30c is provided between an upper surface of the middle body 33 and an inner wall surface of the housing body 31 which are opposed to each other. The refrigerant inflowing from the refrigerant suction port 31b is accumulated in the inflow space 30c. In the present embodiment, a tapered end part of the nozzle body 32 on its lower side is positioned inside the through-hole of the middle body 33. Thus, the inflow space 30c has an annular shape in cross-section when viewed in the direction along the center axes of the swirl space 30a and the depressurizing space 30b.

A suction-refrigerant inflow passage connecting the refrigerant suction port 31b and the inflow space 30c extends in a direction of a tangent to an inner circumferential wall surface of the inflow space 30c when viewed in the direction along the center axis of the inflow space 30c. Accordingly, in the present embodiment, the refrigerant flowing from the refrigerant suction port 31b through the suction-refrigerant inflow passage into the inflow space 30c is made to swirl in the same direction as that of the refrigerant in the swirl space 30a.

The through-hole of the middle body 33 has a part into which a lower part of the nozzle body 32 is inserted, i.e. a part where the middle body 33 and the nozzle body 32 are overlapped when viewed in a radial direction perpendicular to the axial line. In this part of the through-hole, a passage cross-sectional area gradually decreases in the direction of the refrigerant flow so as to correspond to an outer circumferential shape of a tapered end part of the nozzle body 32.

Therefore, a suction passage 30d is provided between an inner circumferential surface defining the through-hole and an outer circumferential surface of the tapered end part on the lower side of the nozzle body 32. The inflow space 30c and a downstream side of the depressurizing space 30b in the refrigerant flow communicate with each other through the suction passage 30d. In other words, according to the present embodiment, the suction-refrigerant inflow passage connecting the refrigerant suction port 31b and the inflow space 30c, the inflow space 30c, and the suction passage 30d provide a for-suction passage 13b that draws a refrigerant from outside.

The suction passage 30d has an annular shape in cross-section perpendicular to the center axis, and the refrigerant flowing in the suction passage 30d has a component of velocity in the same direction as a swirling direction of the refrigerant swirling in the swirl space 30a. Further, a refrigerant outlet of the for-suction passage 13b (i.e. a refrigerant outlet of the suction passage 30d, more specifically) has an annular opening on a radially outer side of the refrigerant outlet (refrigerant ejection port) of the nozzle passage 13a.

The through-hole of the middle body 33 has a pressurizing space 30e on a downstream side of the suction passage 30d in the refrigerant flow, and the pressurizing space 30e has an approximately circular truncated conical shape that spreads gradually in the direction of the refrigerant flow. The pressurizing space 30e is a space into which the ejection refrigerant ejected from the depressurizing space 30b (nozzle passage 13a, more specifically) and the suction refrigerant drawn from the for-suction passage 13b flow.

In the pressurizing space 30e, a lower part of the passage forming member 35 described above is positioned. Moreover, a spread angle of a circular conical side-surface of the passage forming member 35 inside the pressurizing space 30e is smaller than a spread angle of the circular truncated conical-shaped space of the pressurizing space 30e. Hence, a passage cross-sectional area of the refrigerant passage in the pressurizing space 30e gradually expands toward the downstream side along the refrigerant flow.

In the present embodiment, since the passage cross-sectional area expands, as shown in FIG. 5, the pressurizing space 30e includes a diffuser passage 13c between the inner circumferential surface of the middle body 33 and the outer circumferential surface of the lower part of the passage forming member 35. The diffuser passage 13c functions similar to the diffuser portion 20d described in the first embodiment. In the diffuser passage 13c, a kinetic energy of the mixture refrigerant of the ejection refrigerant and the suction refrigerant is converted to a pressure energy.

As shown in FIGS. 3 and 4, the circular conical side-surface of the passage forming member 35 has a groove portion. In the groove portion, a ring-shaped member 36a is disposed. More specifically, the groove portion has an annular shape when the passage forming member 35 is viewed from an upper side in the axial direction. The ring-shaped member 36a has a ring shape (circular cylindrical shape), and is fitted into the groove portion sliding-movably in the axial direction. A center axis of the ring-shaped member 36a is positioned coaxially with the center axes of the swirl space 30a and the passage forming member 35, for example.

The ring-shaped member 36a is connected to an electric drive device 36c through a connection rod 36b. The drive device 36c is positioned on a lower side of the ejector 25. The drive device 36c changes a position of the ring-shaped member 36a in the axial direction. For example, the drive device 36c may employ a linear solenoid or a stepper motor. An operation of the drive device 36c is controlled by a control voltage outputted from the air conditioning controller 21.

More specifically, the drive device 36c changes the position of the ring-shaped member 36a downward in the axial direction, and accordingly, as shown in FIG. 3, an inlet side and an outlet side of the diffuser passage 13c communicate with each other. On the other hand, the drive device 36c changes the position of the ring-shaped member 36a upward in the axial direction, and thereby makes an upper end part of the ring-shaped member 36a contact an inner circumferential surface of the middle body 33 that defines the pressurizing space 30e. Accordingly, as shown in FIG. 4, the diffuser passage 13c is shut off.

In the present embodiment, the positional change of the ring-shaped member 36a by the drive device 36c causes the refrigerant flow path to be switched. Hence, the ring-shaped member 36a of the present embodiment, the connection rod 36b and the drive device 36c may be used as an example of the refrigerant flow-path switching device.

As shown in FIG. 3, opening of the diffuser passage 13c by the ring-shaped member 36a causes the first refrigerant flow path to be selected, and the ejection refrigerant ejected from the nozzle passage 13a flows out of the diffuser passage 13c. As shown in FIG. 4, closing of the diffuser passage 13c by the ring-shaped member 36a causes the second refrigerant flow path to be selected, and the ejection refrigerant flows out of the refrigerant suction port 31b.

As is clear from FIGS. 3 and 5, an upper end surface of the ring-shaped member 36a is exposed to an inside of the diffuser passage 13c even when the drive device 36c has changed the position of the ring-shaped member 36a downward in the axial direction.

Therefore, when the drive device 36c has changed the position of the ring-shaped member 36a downward in the axial direction, the upper end surface of the ring-shaped member 36a may form a part of the circular conical side-surface of the passage forming member 35 without producing any step or the like on a boundary part between the upper end surface of the ring-shaped member 36a and the circular conical side-surface of the passage forming member 35.

Next, the drive device 37 disposed inside the middle body 33 to change the position of the passage forming member 35 will be described. The drive device 37 includes a diaphragm 37a that is a pressure responsive member and has a circular film-plate shape. For example, as shown in FIG. 3, the diaphragm 37a separates a circular cylindrical-shaped space on a radially outer side of the middle body 33 into two spaces that are upper and lower spaces. The diaphragm 37a is fixed by a method such as welding.

The upper space (adjacent to the inflow space 30c) of the two spaces separated by the diaphragm 37a is an enclosing space 37b in which a temperature sensitive medium is enclosed. The temperature sensitive medium changes in pressure depending on a temperature of the refrigerant flowing out of the evaporator 16. In the enclosing space 37b, the temperature sensitive medium having the same composition as the refrigerant circulating in the ejector-type refrigeration cycle 10 is enclosed so as to have a predetermined density. Therefore, the temperature sensitive medium according to the present embodiment is a medium containing R134a as a main component.

On the other hand, the lower space of the two spaces separated by the diaphragm 37a is an introduction space 37c into which the refrigerant flowing out of the evaporator 16 is introduced through a non-shown communication passage. Hence, the temperature of the refrigerant flowing out of the evaporator 16 transfers to the temperature sensitive medium enclosed in the enclosing space 37b through a lid member 37d partitioning the inflow space 30c and the enclosing space 37b and through the diaphragm 37a, for example.

As is clear from FIGS. 3 to 5, the for-suction passage 13b is positioned on an upper side of the middle body 33, and the diffuser passage 13c is positioned on a lower side of the middle body 33. Therefore, at least a part of the drive device 37 is located at a position interposed between the for-suction passage 13b and the diffuser passage 13c in the up-down direction when viewed in the radial direction with respect to the center axis.

More specifically, the enclosing space 37b of the drive device 37 is located at a position overlapping the for-suction passage 13b and the diffuser passage 13c when viewed in the direction along the center axes of the swirl space 30a and the passage forming member 35, and the enclosing space 37b is thereby located at the position surrounded by the for-suction passage 13b and the diffuser passage 13c. Accordingly, the temperature of the refrigerant flowing out of the evaporator 16 transfers to the enclosing space 37b, and an internal pressure of the enclosing space 37b becomes a pressure dependent on the temperature of the refrigerant flowing out of the evaporator 16.

The diaphragm 37a deforms depending on a pressure difference between the internal pressure of the enclosing space 37b and the pressure of the refrigerant flowing out of the evaporator 16 and into the introduction space 37c. Hence, the diaphragm 37a preferably has sufficient elasticity and high heat conductivity and is made of a tough material. For example, it is preferable that the diaphragm 37a is made of a metal thin plate such as stainless (SUS304), for example.

An upper end side of an actuation rod 37e having a circular cylindrical shape is joined to a center part of the diaphragm 37a while a lower end side of the actuation rod 37e is fixed to an outer circumferential part of a lowest part (bottom part) of the passage forming member 35. Accordingly, the diaphragm 37a and the passage forming member 35 are connected to each other, and the passage forming member 35 moves in accordance with movement of the diaphragm 37a. Thus, a passage cross-sectional area of the nozzle passage 13a (a passage cross-sectional area in the narrowest area part 30m) is adjusted.

Specifically, when the temperature (degree of subcooling) of the refrigerant flowing out of the evaporator 16 increases, a saturation pressure of the temperature sensitive medium enclosed in the enclosing space 37b increases. Hence, a pressure difference obtained by subtracting a pressure of the introduction space 37c from the internal pressure of the enclosing space 37b increases. Accordingly, the diaphragm 37a changes the position of the passage forming member 35 in a direction (downward in the vertical direction) so as to increase the passage cross-sectional area of the narrowest area part 30m.

On the other hand, when the temperature (degree of subcooling) of the refrigerant flowing out of the evaporator 16 decreases, the saturation pressure of the temperature sensitive medium enclosed in the enclosing space 37b decreases. Hence, the pressure difference obtained by subtracting the pressure of the introduction space 37c from the internal pressure of the enclosing space 37b decreases. Accordingly, the diaphragm 37a changes the position of the passage forming member 35 in a direction (upward in the vertical direction) so as to decrease the passage cross-sectional area of the narrowest area part 30m.

Since the diaphragm 37a changes the position of the passage forming member 35 in the up-down direction depending on the degree of subcooling of the refrigerant flowing out of the evaporator 16, the passage cross-sectional area at the narrowest area part 30m can be adjusted such that the degree of subcooling of the refrigerant flowing out of the evaporator 16 approaches a predetermined value. A gap between the actuation rod 37e and the middle body 33 is sealed by a non-shown sealing member such as an O-ring, and the refrigerant is prevented from leaking through the gap even when the actuation rod 37e moves.

A bottom surface of the passage forming member 35 is subjected to a load of a coil spring 40 fixed to the lower body 34. The coil spring 40 provides the load to urge the passage forming member 35 in a direction (upward in FIG. 3) to reduce the passage cross-sectional area at the narrowest area part 30m. Adjustment of the load enables a valve opening pressure of the passage forming member 35 to be changed and also enables a target degree of subcooling to be changed.

In the present embodiment, multiple (e.g. two) circular cylindrical spaces are provided on the radially outer side of the middle body 33, the diaphragm 37a having the circular thin film shape is fixed to an inside of each space, and two drive devices 37 are provided. However, the number of the drive devices 37 is not limited to this. When the drive devices 37 are provided at multiple positions, the drive devices 37 may be arranged at regular intervals with respect to the center axis.

Alternatively, a diaphragm including an annular-shaped thin plate may be fixed in a space having an annular shape when viewed in the axial direction, and the diaphragm and the passage forming member 35 may be connected through multiple actuation rods.

Next, the lower body 34 is made of a circular cylindrical metallic member, for example, and is fixed by a method, such as press-fitting or screwing, so as to close a bottom side of the housing body 31. An inner space of the housing body 31 includes a gas-liquid separation space 30f between an upper surface side of the lower body 34 and a bottom surface side of the middle body 33, in which the refrigerant flowing out of the diffuser passage 13c is separated into gas and liquid.

Hence, a most downstream part (refrigerant outflow port) of the diffuser passage 13c of the present embodiment has an opening in the gas-liquid separation space 30f. Further, the gas-liquid separation space 30f has a shape of a body of revolution like an approximately circular cylindrical shape. The gas-liquid separation space 30f is used as an example of a gas-liquid separation device serves a function similar to that of the gas-liquid separator 15 described in the first embodiment. The center axis of the gas-liquid separation space 30f is positioned coaxially with the center axes of the swirl space 30a, the depressurizing space 30b and the passage forming member 35.

The refrigerant flowing out of the diffuser passage 13c and flowing into the gas-liquid separation space 30f has a component of velocity in the same direction as a swirling direction of the refrigerant swirling in the swirl space 30a. Hence, the gas-liquid separation space 30f functions as a centrifugal-separation-type gas-liquid separation device that separates gas and liquid of the refrigerant by action of centrifugal force.

An inner volume of the gas-liquid separation space 30f is set be almost the same as an inner volume of the gas-liquid separator 15 described in the first embodiment. Thus, in the gas-liquid separation space 30f, the separated liquid-phase refrigerant flows out from the liquid-phase refrigerant outflow port 31c with little amount of the liquid-phase refrigerant being accumulated.

The lower body 34 includes a pipe 34a in the center part, and the pipe 34a is disposed coaxially with the gas-liquid separation space 30f and extends upward. Therefore, the liquid-phase refrigerant separated in the gas-liquid separation space 30f is accumulated temporarily on a radially outer side of the pipe 34a.

Provided inside the pipe 34a is a gas-phase refrigerant outflow passage 34b through which the gas-phase refrigerant separated in the gas-liquid separation space 30f is introduced into the gas-phase refrigerant outflow port 31d of the housing body 31. The above-described connection rod 36b connecting the ring-shaped member 36a and the drive device 36c is disposed to extend through a part of the gas-phase refrigerant outflow passage 34b in the up-down direction, thereby connecting the ring-shaped member 36a and the drive device 36c.

An upper end part of the pipe 34a is fixed to the coil spring 40 described above. The coil spring 40 serves also a function as a vibration dampening member that dampens a vibration of the passage forming member 35 due to a pressure pulsation at the time of depressurizing of the refrigerant. A base part (lowermost part) of the pipe 34a has an oil return hole 34c by which the refrigerator oil contained in the liquid-phase refrigerant returns to the compressor 11 through the gas-phase refrigerant outflow passage 34b.

The other configurations and operations of the ejector-type refrigeration cycle 10 are similar to the first embodiment. As described above, the ejector 25 of the present embodiment fulfills a function equivalent to one in which the ejector 20, the opening-closing valve 14 and the gas-liquid separator 15 described in the first embodiment are integrated. Thus, when the ejector-type refrigeration cycle 10 of the present embodiment is actuated, effects similar to those of the first embodiment can be obtained.

More specifically, in the ejector-type refrigeration cycle 10 of the present embodiment, when the rotation rate Nc of the compressor 11 is higher than the standard rotation rate KNc, the ring-shaped member 36a opens the diffuser passage 13c, and accordingly, a first refrigerant flow path (normal operation mode) is selected. As shown by solid arrows in FIGS. 2 to 5, an ejector-type refrigeration cycle in which the refrigerant circulates similarly to the normal operation mode of the first embodiment can be obtained.

When the rotation rate Nc of the compressor 11 is lower than or equal to the standard rotation rate KNc, the ring-shaped member 36a closes the diffuser passage 13c, and accordingly, a second refrigerant flow path (low-load operation mode) is selected. As shown by dashed arrows in FIGS. 2 to 5, an ejector-type refrigeration cycle in which the refrigerant circulates similarly to the low-load operation mode of the first embodiment can be obtained.

Therefore, according to the ejector-type refrigeration cycle 10 of the present embodiment, similar to the first embodiment, the refrigerant can be made to flow into the evaporator 16 regardless of load variation of the cycle, and the blown air can be cooled sufficiently.

According to the ejector 25 of the present embodiment, the swirling of the refrigerant in the swirl space 30a enables a refrigerant pressure on a swirling center side in the swirl space 30a to reduce to a pressure of saturated liquid-phase refrigerant or a pressure at which the refrigerant boils due to pressure reduction (i.e. cavitation is generated). Accordingly, an amount of gas-phase refrigerant can be made to be larger on an inner circumferential side than an outer circumferential side with respect to the swirling center axis. Thus, the refrigerant in the swirl space 30a can be made into a two-phase separated state in which the refrigerant in vicinity of the swirling center line is in a gas-single phase while the refrigerant around the gas-single phase refrigerant is in a liquid-single phase.

The refrigerant that has become the two-phase separated state flows into the nozzle passage 13a, and boiling of the refrigerant is accelerated in the narrowing part 131 of the nozzle passage 13a by wall-surface boiling caused when the refrigerant separates from an outer circumferential wall surface of the annular refrigerant passage and boundary boiling due to a boiling nucleus generated by the cavitation of refrigerant on a center axis side of the annular refrigerant passage. Accordingly, the refrigerant flowing into the narrowest area part 30m of the nozzle passage 13a approaches a gas-liquid mixture state in which the gas-phase refrigerant and the liquid-phase refrigerant are mixed homogeneously.

Further, the refrigerant flow in the gas-liquid mixture state is choked in the vicinity of the narrowest area part 30m, and the choking causes the refrigerant in the gas-liquid mixture state to reach a sonic speed. The refrigerant in the gas-liquid mixture state is accelerated in the widening part 132 and ejected. Accordingly, the boiling acceleration by both the wall-surface boiling and the boundary boiling enables the refrigerant in the gas-liquid mixture state to be accelerated efficiently to the sonic speed. Therefore, an energy conversion efficiency (corresponding to a nozzle efficiency) in the nozzle passage 13a can be improved.

Moreover, in the body 30 of the ejector 25 of the present embodiment, the gas-liquid separation space 30f is provided and separates gas and liquid of the refrigerant flowing out of the diffuser passage 13c. Hence, as compared to a case where a gas-liquid separation device is provided in addition to the ejector 25, a volume of the gas-liquid separation space 30f can be reduced effectively.

Therefore, in the gas-liquid separation space 30f of the present embodiment, the refrigerant flowing out of the diffuser passage 13c having the annular shape in cross-sectional plane has already a component of velocity in the swirling direction. Thus, there is no need to provide a space for generating a swirling flow of the refrigerant in the gas-liquid separation space 30f. Hence, as compared to a case where a gas-liquid separation device in addition to the ejector 25, the volume of the gas-liquid separation space 30f can be reduced effectively.

Since the ejector 25 of the present embodiment includes the drive device 37, the passage forming member 35 can be moved depending on load variation of the ejector-type refrigeration cycle 10, and the passage cross-sectional areas of the nozzle passage 13a and the diffuser passage 13c can be changed. Therefore, the ejector 25 can be operated appropriately in accordance with the load variation of the ejector-type refrigeration cycle 10.

Third Embodiment

Figure 6:
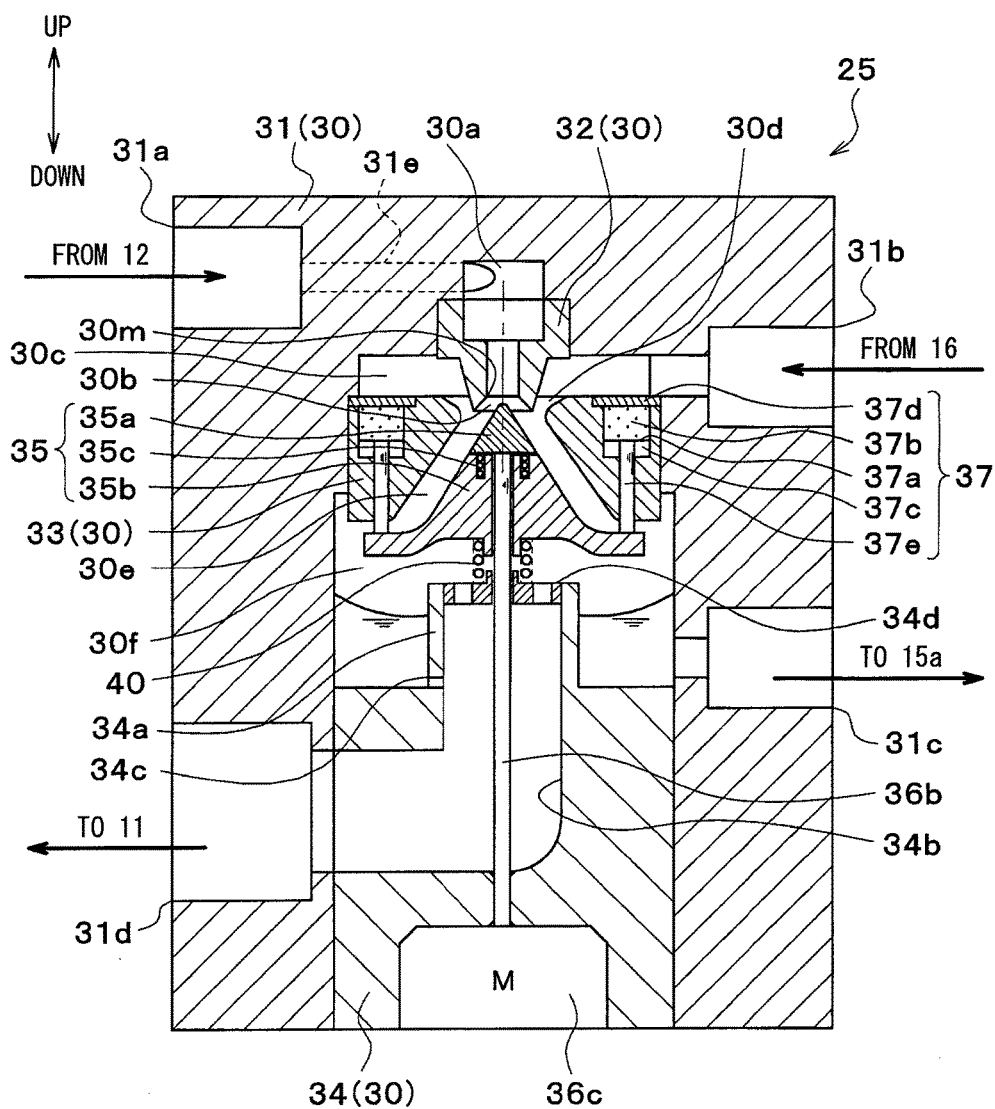
FIG. 6 is a sectional diagram showing an ejector according to a third embodiment of the present disclosure.
Figure 7:
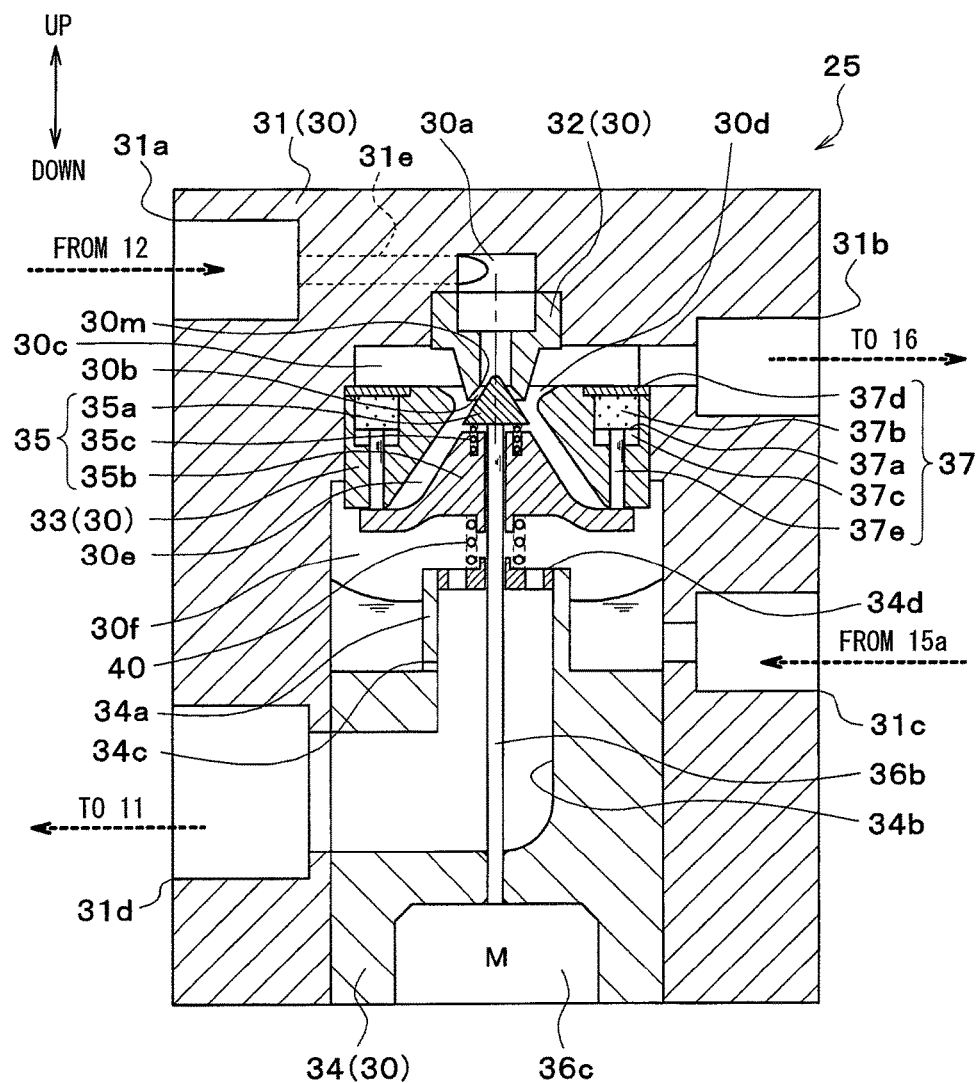
FIG. 7 is a sectional diagram showing the ejector according to the third embodiment.

In a present embodiment, an ejector 25 changed in configuration from the second embodiment will be described as an example. Specifically, in the ejector 25 of the present embodiment, as shown in FIGS. 6 and 7, a passage forming member 35 includes a sub valve body portion 35a and a main body portion 35b which are members separated from each other. The passage forming member 35 further includes a coil spring 35c between the sub valve body portion 35a and the main body portion 35b.

The sub valve body portion 35a has an approximately circular conical shape and is positioned on an upper side of the main body portion 35b. Further, the main body portion 35b has an approximately circular truncated conical shape. As shown in FIG. 6, when a bottom surface of the sub valve body portion 35a is made to contact an upper surface of the main body portion 35b by compression of the coil spring 35c, an outer circumferential surface of the sub valve body portion 35a and an outer circumferential surface of the main body portion 35b are connected to each other with providing a smooth continuous surface. Therefore, the passage forming member 35 having an approximately circular cylindrical shape similar to that of the first embodiment can be obtained.

The bottom surface of the sub valve body portion 35a is connected to a drive device 36c through a connection rod 36b. Hence, the drive device 36c of the present embodiment serves a function to change a position of the sub valve body portion 35a in the axial direction.

When the drive device 36c has changed the position of the sub valve body portion 35a downward in the axial direction, as shown in FIG. 6, the coil spring 35c is compressed, and the bottom surface of the sub valve body portion 35a contacts the upper surface of the main body portion 35b. Accordingly, the main body portion 35b is subjected to a load of the coil spring 35c located on an upper side of the main body portion 35b such that the main body portion 35b is urged downward in the axial direction. The main body portion 35b is subjected to a load of a coil spring 40 located on a lower side of the main body portion 35b such that the main body portion 35b is urged upward in the axial direction.

In this case, in the present embodiment, specifications of the coil spring 35c and the coil spring 40 are determined such that the load applied to the main body portion 35b from the coil spring 35c and the load applied to the main body portion 35b from the coil spring 40 cancel each other out mostly. Thus, when the drive device 36c changes the position of the sub valve body portion 35a downward in the axial direction, the sub valve body portion 35a and the main body portion 35b are moved by a load applied by the drive device 37 similarly to the passage forming member 35 of the second embodiment.

Hence, in the present embodiment, when the drive device 36c has changes the position of the sub valve body portion 35a downward in the axial direction, the sub valve body portion 35a and the main body portion 35b move in an integrated manner similarly to the passage forming member 35 of the second embodiment while an inlet side of a diffuser passage 13c and an inlet side of a gas-liquid separation space 30f communicate with each other.

On the other hand, when the drive device 36c changes the position of the sub valve body portion 35a upward in the axial direction, as shown in FIG. 7, the bottom surface of the sub valve body portion 35a is separated from the upper surface of the main body portion 35b. Accordingly, the load applied to the main body portion 35b from the coil spring 35c reduces, and thus, the main body portion 35b moves upward by the load that is applied from the coil spring 40 and urges the main body portion 35b upward in the vertical direction.

Accordingly, an outer circumferential part of a lowest part (bottom part) of the main body portion 35b having the approximately circular truncated conical shape contacts a bottom surface of the middle body 33, thereby closing an outlet side of the diffuser passage 13c.

In other words, according to the present embodiment, the movement of the sub valve body portion 35a by the drive device 36c enables the refrigerant flow path to be switched. Therefore, the sub valve body portion 35a, the main body portion 35b, the connection rod 36b and the drive device 36c of the present embodiment are used as an example of the above-described refrigerant flow-path switching device.

As shown in FIG. 6, the sub valve body portion 35a and the main body portion 35b move as one while the main body portion 35b opens the diffuser passage 13c. Accordingly, a first refrigerant flow path, in which an ejection refrigerant ejected from a nozzle passage 13a flows out of the diffuser passage 13c, is selected. As shown in FIG. 7, since the main body portion 35b closes the diffuser passage 13c, a second refrigerant flow path, in which the ejection refrigerant flows out of a refrigerant suction port 31b, is selected.

The other configurations and operations of the ejector-type refrigeration cycle 10 are similar to the second embodiment. Therefore, according to the ejector-type refrigeration cycle 10 of the present embodiment, similarly to the second embodiment, the refrigerant can be made to flow into the evaporator 16 regardless of load variation of the cycle, and blown air can be cooled sufficiently.

Fourth Embodiment

In a present embodiment, the refrigerant flow-path switching device changed in configuration from the above-described embodiments will be described as an example.

Figure 8:
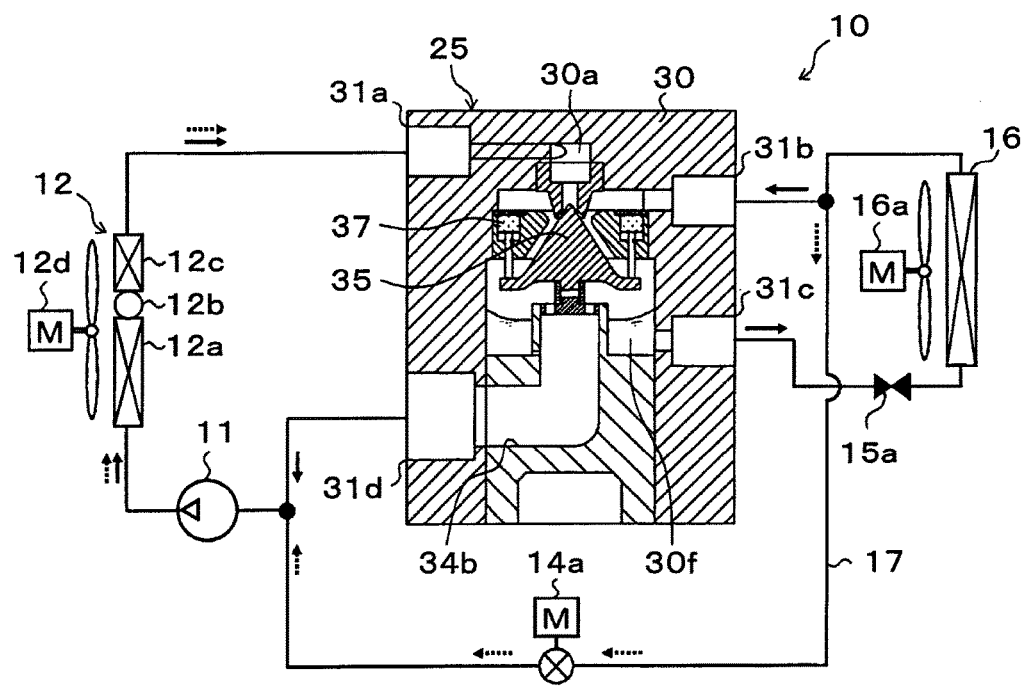
FIG. 8 is a schematic diagram showing an ejector-type refrigeration cycle according to a fourth embodiment of the present embodiment.

Specifically, in an ejector-type refrigeration cycle 10 of the present embodiment, as shown in FIG. 8, a bypass passage 17 connecting a refrigerant outlet side of an evaporator 16 and a suction port side of a compressor 11 is added as compared to the second embodiment. An opening-closing valve 14a (opening-closing device) that opens or closes the bypass passage 17 is used as an example of the refrigerant flow-path switching device. In FIG. 8, a first refrigerant flow path is shown by solid arrows while a second refrigerant flow path is shown by dashed arrows.

Therefore, in an ejector 25 of the present embodiment, the ring-shaped member 36a, the connection rod 36b, the drive device 36c and the like which are an example of the refrigerant flow-path switching device are omitted. Further, the opening-closing valve 14 of the present embodiment includes an electromagnetic valve that is a non-energization closed type (i.e. normally-closed type). An operation of the opening-closing valve 14 is controlled by a control voltage outputted from an air-conditioning controller 21. The other configurations of the ejector-type refrigeration cycle 10 are similar to the second embodiment.

Next, an operation of the ejector-type refrigeration cycle 10 of the present embodiment will be described. In the present embodiment, when the air-conditioning controller 21 (refrigerant flow-path control portion 21b) determines the control voltage outputted to the opening-closing valve 14a, and when a rotation rate Nc of the compressor 11 is lower than or equal to a standard rotation rate KNc, it is determined to open the opening-closing valve 14a.

As described in the first embodiment, when the rotation rate Nc of the compressor 11 is higher than the standard rotation rate KNc, the ejector 25 is capable of sufficiently drawing the refrigerant flowing out of the evaporator 16. Hence, a pressure difference obtained by subtracting a refrigerant pressure on an outlet side of the evaporator 16 (i.e. a refrigerant pressure on a side of the refrigerant suction port 31b of the ejector 25) from a refrigerant pressure on an inlet side of the evaporator 16 (i.e. a refrigerant pressure on a side of a liquid-phase refrigerant outflow port 31c of the ejector 25) is sufficiently large.

Thus, since the opening-closing valve 14a closes the bypass passage 17 when the rotation rate Nc of the compressor 11 is higher than the standard rotation rate KNc, the first refrigerant flow path (normal operation mode), in which the refrigerant flowing out of the evaporator 16 flows out toward the refrigerant suction port 31b, can be selected.

On the other hand, when the rotation rate Nc of the compressor 11 is lower than or equal to the standard rotation rate KNc, a suction performance of the ejector 25 is reduced. Hence, the pressure difference obtained by subtracting the refrigerant pressure on the outlet side of the evaporator 16 (i.e. the refrigerant pressure on the side of the refrigerant suction port 31b of the ejector 25) from the refrigerant pressure on the inlet side of the evaporator 16 (i.e. the refrigerant pressure on the side of the liquid-phase refrigerant outflow port 31c of the ejector 25) is quite small.

Thus, since the opening-closing valve 14a opens the bypass passage 17 when the rotation rate Nc of the compressor 11 is lower than or equal to the standard rotation rate KNc, the second refrigerant flow path (low-load operation mode), in which the refrigerant flowing out of the evaporator 16 due to a suction negative pressure of the compressor 11 flows out toward the suction port side of the compressor 11, can be selected. The other operations are similar to the first embodiment. Hereinafter, each operation will be described.

(a) Normal Operation Mode

The normal operation mode is an operation mode performed when the rotation rate Nc of the compressor 11 is higher than the standard rotation rate KNc, i.e. a thermal load of the cycle is higher than a standard thermal load, and when the first refrigerant flow path is selected by closing of the opening-closing valve 14a.

In the ejector-type refrigeration cycle 10 in which the first refrigerant flow path is selected, as shown by solid arrows of FIG. 8, the refrigerant circulates in an order: the compressor 11→a radiator 12→a nozzle passage of the ejector 25→a diffuser passage of the ejector 25→a gas-liquid separation space 30f of the ejector 25→the compressor 11, while the refrigerant circulates in an order: the gas-liquid separation space 30f→a fixed throttle 15a→the evaporator 16→the refrigerant suction port 31b of the ejector 25.

Therefore, an ejector-type refrigeration cycle similar to the normal operation mode described in the first embodiment can be obtained and operated similarly thereto.

(b) Low-Load Operation Mode

The low-load operation mode is an operation mode performed when the rotation rate Nc of the compressor 11 is lower than or equal to the standard rotation rate KNc, i.e. the thermal load of the cycle is lower than or equal to the standard thermal load, and when the second refrigerant flow path is selected by opening of the opening-closing valve 14a.

In the ejector-type refrigeration cycle 10 in which the second refrigerant flow path is selected, as shown by dashed arrows in FIG. 8, the refrigerant circulates in an order: the compressor 11→the radiator 12→the nozzle passage of the ejector 25→the diffuser passage of the ejector 25→the gas-liquid separation space 30f of the ejector 25→the fixed throttle 15a→the evaporator 16→the bypass passage 17→the compressor 11. Therefore, it can be operated similarly to the low-load operation mode described in the first embodiment similarly to the normal operation mode.

Hence, a refrigeration cycle similar to the normal operation mode described in the first embodiment can be configured and operated similarly thereto.

Therefore, according to the ejector-type refrigeration cycle 10 of the present embodiment, similarly to the second embodiment, the refrigerant can be made to flow into the evaporator 16 regardless of load variation of the cycle, and blown air can be cooled sufficiently.

In the low-load operation mode in which the second refrigerant flow path is selected by the opening-closing valve 14a, the rotation rate Nc of the compressor 11 is lower than or equal to the standard rotation rate KNc, and the refrigerant pressure on the side of the liquid-phase refrigerant outflow port 31c of the ejector 25 is equivalent to the refrigerant pressure on the side of the refrigerant suction port 31b of the ejector 25. Additionally, the refrigerant pressure on the side of the refrigerant suction port 31b of the ejector 25 is equivalent to the refrigerant pressure on the side of a gas-phase refrigerant outflow port 31d of the ejector 25.

Hence, in the low-load operation mode, the gas-phase refrigerant flowing out of the gas-phase refrigerant outflow port 31d due to a suction negative pressure of the compressor 11 flows toward the suction port of the compressor 11. Thus, a flow rate of the refrigerant flowing out of the evaporator 16 may reduce. Therefore, an opening-closing device that opens or closes the gas-phase refrigerant outflow port 31d of the ejector 25 may be provided, and the gas-phase refrigerant outflow port 31d may be closed in the low-load operation mode.

The present disclosure is not limited to the above-described embodiments and can be modified variously as below without departing from the scope of the present disclosure.

(1) In the above-described embodiments, when the rotation rate Nc of the compressor 11 is lower than or equal to the standard rotation rate KNc, the thermal load of the cycle is assumed to be lower than or equal to the standard thermal load, and the first refrigerant flow path is switched to the second refrigerant flow path. However, the determination of the thermal load of the cycle is not limited to this.

For example, when a pressure difference obtained by subtracting the refrigerant pressure on a side of the refrigerant suction port 20c (refrigerant suction port 31b) from a refrigerant pressure on an outlet side of a diffuser portion 20d (diffuser passage 13c) is lower than or equal to a standard pressure difference, the first refrigerant flow path may be switched to the second refrigerant flow path.

Alternatively, when a refrigerant discharge pressure of the compressor 11 is lower than or equal to a standard discharge pressure, or when a refrigerant discharge temperature of the compressor 11 is lower than or equal to a predetermined standard discharge temperature, the first refrigerant flow path may be switched to the second refrigerant flow path. Furthermore, when an outside air temperature is lower than or equal to a predetermined standard outside air temperature, the first refrigerant flow path may be switched to the second refrigerant flow path.

(2) Each component device of the ejector-type refrigeration cycle 10 is not limited to the above-described embodiments.

More specifically, in the above-described embodiments, the opening-closing valve 14, 14a is adopted as an example of the refrigerant flow-path switching device, but the refrigerant flow-path switching device is not limited to this. For example, a differential pressure control valve having a mechanical mechanism may be used as the refrigerant flow-path switching device. The differential pressure control valve may open when a pressure difference obtained by subtracting the refrigerant pressure on the side of the refrigerant suction port 20c (refrigerant suction port 31b) from the refrigerant pressure on the outlet side of the diffuser portion 20d (diffuser passage 13c) is lower than or equal to the standard pressure difference.

In the ejector-type refrigeration cycle 10 described in the fourth embodiment, instead of the opening-closing valve 14a, a three-way valve may be adopted in an inlet part of the bypass passage. The three-way valve switches the refrigerant flow path between a path through which the refrigerant flowing out of the evaporator 16 is introduced to the refrigerant suction port 31b and a path through which the refrigerant is introduced to the suction port of the compressor 11.

In the above-described embodiments, an example in which a sub-cooling type heat exchanger is adopted as the radiator 12 is described, but a normal radiator consisting only of the condenser portion 12a. Further, together with the normal radiator, a liquid receiver may be adopted. The liquid receiver separates gas and liquid of the refrigerant that has radiated heat in this radiator, and accumulates therein liquid-phase refrigerant.

In the above-described embodiments, an example in which component members, such as the nozzle portion 20a and the body portion 20b of the ejector 20, and component members, such as the body 30 and the passage forming member 35 of the ejector 25, are made of metal. However, the material of the component members is not limited as long as a function of each component member can be fulfilled. Therefore, these component members may be made of resin, for example.

In the ejector 20 of the above-described first embodiment, a swirl space in which a swirl flow is generated in the refrigerant flowing into the nozzle portion 20a is not provided. However, similarly to the ejector 25 of the second to fourth embodiments, a swirl space forming member defining such swirl space may be provided.

In the above-described first embodiment, an example is described, in which the ejector 20 includes a fixed nozzle portion where a passage cross-sectional area of a narrowest area part is not changed. However, the ejector 20 may include a variable nozzle portion capable of changing the passage cross-sectional area of the narrowest area part. The variable nozzle portion may employ, for example, one in which a needle-like or circular conical-shaped valve body is positioned inside a passage of the variable nozzle portion, and the valve body is moved by an electric actuator or the like to regulate the passage cross-sectional area.

In the above-described second to fourth embodiments, an example is described, where the enclosing space 37b in which the temperature sensitive medium changes in pressure in accordance with temperature change is enclosed, and the diaphragm 37a moving depending on a pressure of the temperature sensitive medium in the enclosing space 37b are adopted as the drive device 37 that changes the position of the passage forming member 35. However, the drive device is not limited to this.

For example, a thermowax that changes in volume by a temperature may be adopted as the temperature sensitive medium, and one including an elastic member made of a shape-memory alloy may be adopted as the drive device. Further, one that changes the position of the passage forming member 35 by an electric mechanism such as an electric motor or a solenoid may be adopted as the drive device.

In the above-described embodiments, an example is described, in which the fixed throttle 15a is disposed between the liquid-phase refrigerant outflow port of the gas-liquid separator 15 and the evaporator 16, or between the liquid-phase refrigerant outflow port 31c of the ejector 25 and the evaporator 16. However, the fixed throttle 15a may be omitted. A depressurizing device (e.g. orifice) may be disposed in the liquid-phase refrigerant outflow port of the gas-liquid separator 15 or the liquid-phase refrigerant outflow port 31c of the ejector 25.

(3) In the fourth embodiment, similarly to the second and third embodiments, an example is described, in which the gas-liquid separator-integrated ejector 25 is adopted. However, similarly to the first embodiment, the ejector 20 and the gas-liquid separator 15 which are provided as separate members may be adopted.

(4) In the above-described embodiments, an example is described, in which the ejector-type refrigeration cycle 10 according to the present disclosure is used for the vehicular air conditioner. However, the usage of the ejector-type refrigeration cycle 10 is not limited to this. For example, the ejector-type refrigeration cycle 10 may be used for a stationary air conditioner, a cooling-heating storage container, or a cooling-heating device for an automatic vending machine.

In the above-describe embodiments, the radiator 12 of the ejector-type refrigeration cycle 10 according to the present disclosure is used as an exterior-side heat exchanger in which the refrigerant and the outside air exchange heat, and the evaporator 16 is used as a using-side heat exchanger which cools the blown air. Conversely, the evaporator 16 may be used as an exterior-side heat exchanger which absorbs heat from a heat source such as the outside air, and the radiator 12 may be used as a using-side heat exchanger that heats a heating target fluid such as air or water. In other words, the ejector-type refrigeration cycle 10 may be used as a heat pump cycle.

(5) In the above-described embodiments, it is described that R134a or R1234yf can be adopted, but the refrigerant is not limited to these. For example, R600a, R410A, R404A, R32, R1234yfxf or R407C may be adopted. Further, a mixture refrigerant obtained by mixing multiple kinds among these refrigerants may be adopted.

What is claimed is:

1. A refrigeration cycle comprising:
a compressor compressing and discharging a refrigerant;
a radiator radiating heat of the refrigerant discharged from the compressor;
an ejector including a nozzle portion depressurizing the refrigerant flowing out of the radiator, a refrigerant suction port drawing a refrigerant by a suction action of an ejection refrigerant ejected at high speed from the nozzle portion, and a pressurizing portion pressurizing a mixture refrigerant of the ejection refrigerant and a suction refrigerant drawn from the refrigerant suction port;
a gas-liquid separation device separating the refrigerant flowing out of the pressurizing portion into a gas-phase refrigerant and a liquid-phase refrigerant, and causing the gas-phase refrigerant to flow out toward a suction port of the compressor;
an evaporator disposed in a refrigerant passage connecting a liquid-phase refrigerant outflow port of the gas-liquid separation device and the refrigerant suction port, the evaporator evaporating the refrigerant passing therethrough; and
a refrigerant flow-path switching device switching a path of the refrigerant circulating in a cycle, the refrigerant flow-path switching device including an opening-closing device placed in the pressurizing portion, the opening-closing device opening or closing a refrigerant passage forming the pressurizing portion, wherein
the refrigerant flow-path switching device is capable of switching between a first refrigerant flow path, in which the ejection refrigerant flows out of the pressurizing portion, and a second refrigerant flow path, in which the ejection refrigerant flows out of the refrigerant suction port,
when the refrigerant flow-path switching device switches from the second refrigerant flow path to the first refrigerant flow path, the opening-closing device opens the refrigerant passage forming the pressurizing portion, and
when the refrigerant flow-path switching device switches from the first refrigerant flow path to the second refrigerant flow path, the opening-closing device closes the refrigerant passage forming the pressurizing portion.

2. The refrigeration cycle according to claim 1, wherein the opening-closing device opens or closes a refrigerant passage leading from an inlet side of the pressurizing portion to an inlet side of the gas-liquid separation device,
the opening-closing device opens the refrigerant passage leading from the inlet side of the pressurizing portion to the inlet side of the gas-liquid separation device, thereby selecting the first refrigerant flow path, and the opening-closing device closes the refrigerant passage leading from the inlet side of the pressurizing portion to the inlet side of the gas-liquid separation device, thereby selecting the second refrigerant flow path.

3. The refrigeration cycle according to claim 1, wherein the ejector and the gas-liquid separation device are integrated with each other, and a refrigerant outflow port of the pressurizing portion opens inside the gas-liquid separation device.

4. The refrigeration cycle according to claim 1, further comprising a refrigerant flow-path control portion controlling an operation of the opening-closing device, wherein the refrigerant flow-path control portion controls the opening-closing device to switch from the first refrigerant flow path to the second refrigerant flow path when a thermal load of the cycle is lower than or equal to a predetermined thermal load.

5. The refrigeration cycle according to claim 1, wherein the nozzle portion is changeable in passage cross-sectional area.

6. A refrigeration cycle comprising:
a compressor compressing and discharging a refrigerant;
a radiator radiating heat of the refrigerant discharged from the compressor;
an ejector including a nozzle portion depressurizing the refrigerant flowing out of the radiator, a refrigerant suction port drawing a refrigerant by a suction action of an ejection refrigerant ejected at high speed from the nozzle portion, and a pressurizing portion pressurizing a mixture refrigerant of the ejection refrigerant and a suction refrigerant drawn from the refrigerant suction port;
a gas-liquid separation device separating the refrigerant flowing out of the pressurizing portion into a gas-phase refrigerant and a liquid-phase refrigerant, and causing the gas-phase refrigerant to flow out toward a suction port of the compressor;
an evaporator disposed in a refrigerant passage connecting a liquid-phase refrigerant outflow port of the gas-liquid separation device and the refrigerant suction port, the evaporator evaporating the refrigerant passing therethrough;
a bypass passage connecting a refrigerant outlet side of the evaporator and a suction port side of the compressor;
a refrigerant flow-path switching device switching a path of the refrigerant circulating in a cycle, wherein
the refrigerant flow-path switching device is capable of switching between a first refrigerant flow path, in which the refrigerant flowing out of the evaporator flows toward the refrigerant suction port, and a second refrigerant flow path, in which the refrigerant flowing out of the evaporator flows toward the suction port side of the compressor through the bypass passage.

7. The refrigeration cycle according to claim 6, wherein the refrigerant flow-path switching device includes an opening-closing device that opens or closes the bypass passage, the opening-closing device closes the bypass passage, thereby selecting the first refrigerant flow path, and the opening-closing device opens the bypass passage, thereby selecting the second refrigerant flow path.

8. The refrigeration cycle according to claim 6, wherein the ejector and the gas-liquid separation device are integrated with each other, and a refrigerant outflow port of the pressurizing portion opens inside the gas-liquid separation device.

9. The refrigeration cycle according to claim 6, further comprising a refrigerant flow-path control portion controlling an operation of the opening-closing device, wherein the refrigerant flow-path control portion controls the opening-closing device to switch from the first refrigerant flow path to the second refrigerant flow path when a thermal load of the cycle is lower than or equal to a predetermined thermal load.

10. The refrigeration cycle according to claim 6, wherein the nozzle portion is changeable in passage cross-sectional area.

* * * * *